US011390163B2

(12) United States Patent
Galang et al.

(10) Patent No.: US 11,390,163 B2
(45) Date of Patent: Jul. 19, 2022

(54) VARIABLE WHEEL DRIVE ELECTRIC VEHICLE COMPRISING SELECTIVELY ATTACHABLE AND DETACHABLE ELECTRIC HUB MOTORS AND METHOD OF USING THE SAME

(71) Applicant: Toyota Motor Engineering & Manufacturing North America, Inc., Plano, TX (US)

(72) Inventors: Abril A. Galang, Ann Arbor, MI (US); Justin J. Chow, Los Angeles, CA (US); Robert C. MacArthur, Ypsilanti, MI (US); Joshua D. Payne, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 520 days.

(21) Appl. No.: 16/551,892

(22) Filed: Aug. 27, 2019

(65) Prior Publication Data
US 2021/0061095 A1     Mar. 4, 2021

(51) Int. Cl.
*B60K 23/08* (2006.01)
*B60K 17/356* (2006.01)
(Continued)

(52) U.S. Cl.
CPC ............ *B60K 23/08* (2013.01); *B60K 7/0007* (2013.01); *B60K 17/354* (2013.01);
(Continued)

(58) Field of Classification Search
CPC .... B60K 23/08; B60K 7/0007; B60K 17/354; B60K 17/356; B62D 61/10; B60Y 2200/91; B60Y 2400/82
See application file for complete search history.

(56) References Cited

U.S. PATENT DOCUMENTS 2,748,879 A * 6/1956 Bailey ................... B62D 61/10
                                                180/24.07
3,532,384 A * 10/1970 Williams, Jr. ............ B60B 3/16
                                                   301/128
(Continued)

FOREIGN PATENT DOCUMENTS

GB         2456349 A      7/2009
GB         2456350 A      7/2009
(Continued)

*Primary Examiner* — Jacob B Meyer
(74) *Attorney, Agent, or Firm* — Christopher G. Darrow; Darrow Mustafa PC

(57) ABSTRACT

A variable wheel drive electric vehicle comprises a chassis; a first axle disposed on the chassis comprising: a pair of opposed first axle ends; a pair of first axle hubs attached to the first ends, a pair of motive wheels configured for rotatable disposition on the first hubs, and a pair of electric hub motors each comprising a stator and a rotor, the rotors configured for reversible motive rotation of the motive wheels by and about the stators; a second axle disposed on the chassis comprising: a pair of opposed second axle ends; a pair of second axle hubs attached to the second ends; a pair of non-motive wheels configured for rotatable disposition on the second hubs; and a pair of hub motor blanks each comprising a stator blank and rotor blank, the rotor blanks configured for reversible non-motive rotation of the non-motive wheels by and about the stator blanks.

20 Claims, 9 Drawing Sheets

(51) Int. Cl.
  B62D 61/10 (2006.01)
  B60K 7/00 (2006.01)
  B60K 17/354 (2006.01)
(52) U.S. Cl.
  CPC ............ B60K 17/356 (2013.01); B62D 61/10 (2013.01); *B60Y 2200/91* (2013.01); *B60Y 2400/82* (2013.01)

(56) References Cited

U.S. PATENT DOCUMENTS

| | | | | |
|---|---|---|---|---|
| 3,770,074 A * | 11/1973 | Sherman | ............... | B60L 3/0061 180/370 |
| 3,786,889 A * | 1/1974 | Kelley | .................... | B60G 9/00 180/242 |
| 3,897,843 A * | 8/1975 | Hapeman | .................. | B60T 1/06 310/67 R |
| 4,007,968 A * | 2/1977 | Solis | ....................... | B60B 11/02 301/38.1 |
| 4,164,358 A * | 8/1979 | Entrup | .................... | B60B 11/02 301/36.1 |
| 4,330,045 A * | 5/1982 | Myers | ..................... | F16D 55/22 475/900 |
| 4,389,586 A * | 6/1983 | Foster | ................... | B60K 7/0007 310/67 R |
| 4,799,564 A * | 1/1989 | Iijima | ................... | B60K 17/046 475/159 |
| 5,551,349 A * | 9/1996 | Bodzin | ................. | B60B 19/125 301/5.23 |
| 5,813,487 A * | 9/1998 | Lee | ........................ | B62D 7/159 180/65.245 |
| 6,135,259 A * | 10/2000 | Forster | .................. | B60K 17/046 475/83 |
| 6,276,474 B1 * | 8/2001 | Ruppert | ................ | B60K 7/0007 180/65.6 |
| 6,298,932 B1 * | 10/2001 | Bowman | ................. | B60B 11/00 180/6.5 |
| 6,328,123 B1 * | 12/2001 | Niemann | .............. | B60L 3/0061 180/65.6 |
| 6,588,538 B2 * | 7/2003 | Hinton | .................... | B60B 11/06 180/363 |
| 6,637,834 B2 * | 10/2003 | Elkow | .................... | B60B 11/00 301/36.1 |
| 6,890,039 B2 * | 5/2005 | Chung | .................. | B60B 11/00 384/271 |
| 6,922,004 B2 * | 7/2005 | Hashimoto | ............. | H02K 7/116 310/268 |
| 7,147,073 B2 * | 12/2006 | Mollhagen | ........... | B60K 17/046 180/65.6 |
| 7,466,049 B1 * | 12/2008 | Vancea | .................... | B60K 6/26 310/198 |
| 7,556,112 B2 * | 7/2009 | Suzuki | ................. | B60K 7/0007 310/90 |
| 7,621,357 B2 * | 11/2009 | Suzuki | ................... | B60G 7/008 310/67 R |
| 7,757,795 B2 * | 7/2010 | Chien | .................... | B60K 17/36 180/24.03 |
| 8,100,806 B2 * | 1/2012 | Shibukawa | ......... | F16H 57/0482 475/159 |
| 8,215,423 B2 * | 7/2012 | Terry | ........................ | G21F 5/14 414/458 |
| 8,342,612 B2 * | 1/2013 | Sgherri | ................. | B60K 7/0007 301/6.5 |
| 8,459,386 B2 * | 6/2013 | Pickholz | .............. | B60K 7/0007 180/65.6 |
| 8,562,472 B2 * | 10/2013 | Shinohara | ............ | B60K 17/046 475/159 |
| 8,733,478 B2 * | 5/2014 | Chapman | ............... | F16M 11/18 280/124.171 |
| 8,746,396 B2 * | 6/2014 | Vallejo | .................. | B60B 27/001 180/383 |
| 8,925,659 B2 * | 1/2015 | Peters | ................... | B62D 47/003 180/294 |
| 9,216,612 B2 * | 12/2015 | Zdrahal | ................ | B60B 19/003 |
| 9,308,810 B1 * | 4/2016 | Kurdy | ..................... | B60K 7/00 |
| 9,387,758 B2 * | 7/2016 | Heinen | .................. | B60L 15/20 |
| 9,428,265 B2 * | 8/2016 | Cox | ....................... | B60K 7/0007 |
| 9,475,342 B2 * | 10/2016 | Feng | ...................... | B60K 7/0007 |
| 9,616,706 B2 * | 4/2017 | Benoit, Jr. | ............. | B60B 11/02 |
| 9,688,099 B2 * | 6/2017 | Niemczyk | ............... | B60B 11/02 |
| 10,005,352 B2 * | 6/2018 | Aich | ...................... | B60K 7/0007 |
| 2002/0175009 A1 | 11/2002 | Kress | .................... | B62D 7/04 180/199 |
| 2010/0025131 A1 * | 2/2010 | Gloceri | .................. | B60K 6/52 180/65.265 |
| 2010/0194180 A1 * | 8/2010 | Gibson | .................. | B60B 11/04 301/36.1 |
| 2012/0018984 A1 * | 1/2012 | Oriet | ..................... | B60K 17/36 475/331 |
| 2014/0340013 A1 * | 11/2014 | Li | .......................... | H02K 29/08 318/722 |
| 2017/0225684 A1 * | 8/2017 | Alshamrani | ......... | B60K 26/021 |
| 2018/0236813 A1 * | 8/2018 | Ochiai | .................... | B60B 11/02 |
| 2019/0058372 A1 * | 2/2019 | Yamamoto | ............. | H02K 7/116 |
| 2020/0290450 A1 * | 9/2020 | Van Seventer | .......... | H02K 7/14 |
| 2021/0061005 A1 * | 3/2021 | Galang | .................... | B60K 1/02 |
| 2021/0061093 A1 * | 3/2021 | Li | .......................... | H02K 7/116 |
| 2021/0061095 A1 * | 3/2021 | Galang | .................... | B60K 17/354 |
| 2021/0094405 A1 * | 4/2021 | Payne | ..................... | B60K 6/442 |
| 2021/0094407 A1 * | 4/2021 | Payne | .................. | B60K 7/0007 |
| 2021/0122227 A1 * | 4/2021 | Bindl | ................ | B60B 27/0052 |
| 2021/0221218 A1 * | 7/2021 | Li | ........................ | F16D 65/827 |
| 2021/0252967 A1 * | 8/2021 | Iwabuchi | ................. | B60B 35/14 |

FOREIGN PATENT DOCUMENTS

| | | |
|---|---|---|
| GB | 2472297 A | 2/2011 |
| WO | 2009090386 A2 | 7/2009 |

* cited by examiner

VARIABLE WHEEL DRIVE ELECTRIC VEHICLE COMPRISING SELECTIVELY ATTACHABLE AND DETACHABLE ELECTRIC HUB MOTORS AND METHOD OF USING THE SAME

FIELD OF THE INVENTION

The embodiments disclosed herein relate generally to a variable wheel drive electric vehicle comprising electric hub motors and a method of using the same. More particularly, it relates to a variable wheel drive electric vehicle comprising selectively attachable and detachable electric hub motors and a method of using the same.

BACKGROUND

Electric hub motors or wheel motors, that is, electric motors that are incorporated into the hubs of wheels and drive them directly are increasingly being used in a wide variety of wheeled electric vehicles (EV's), particularly automotive electric vehicles. Typically, electric hub motors, particularly those used on various automotive electric vehicles are very closely integrated with the drive wheels on which they are installed such that they may not be removed without removing the entire wheel on which they are integrated. Frequently, the hub motor components, particularly the cylindrical rotor and cylindrical stator components, are not accessible for attachment or detachment from the outward facing side of the wheel. When one of the hub motor components fails, or when a change or upgrade of a motor component is desired, the entire hub motor and wheel must be removed to be serviced. The integrated hub motor and wheel assembly is heavy and expensive. Thus, the electric hub motors generally cannot be removed, replaced, repaired, or serviced directly by a vehicle user or operator, and they generally require service at a dedicated service facility, such as a dealer or dedicated vehicle repair shop, by trained service technicians. Furthermore, because removal of electric hub motors and their associated wheels is difficult, there are very limited options for changing the location of a hub motor and wheel on vehicles that employ them, either on the same axle or between axles. While vehicles that employ electric hub motors and wheels are useful with these constraints, enabling the electric hub motors and/or their components to be more easily separated and more easily accessible would reduce repair and replacement costs, enhance the usefulness and utility of electric hub motors, and thereby enhance vehicle owner and operator satisfaction.

Therefore, it would be very desirable to provide an electric vehicle that uses motive wheels and electric hub motors that can be reconfigured on the vehicle, as well as methods of reconfiguring the motive wheels and electric hub motors, that would address the limitations and provide the benefits mentioned.

SUMMARY OF THE INVENTION

In one embodiment, a variable wheel drive electric vehicle is disclosed. The variable wheel drive electric vehicle comprises a vehicle chassis; a first axle disposed on the vehicle chassis, comprising: a pair of opposed first axle ends, the opposed first axle ends axially spaced apart along a first axle axis; a pair of first axle hubs attached to the first axle ends, a pair of motive wheels each comprising an inner surface and an outer surface and configured for radially extending rotatable disposition on the first axle hubs, and a pair of electric hub motors each comprising a stator and a rotor, the stators configured for selective attachment to and detachment from the first axle hubs, the rotors configured for selective attachment to and detachment from the motive wheels, the rotors configured for reversible motive rotation of the motive wheels by and about the stators; a second axle longitudinally spaced from the first axle and disposed on the vehicle chassis, comprising: a pair of opposed second axle ends, the opposed second axle ends axially spaced apart along a second axle axis; a pair of second axle hubs attached to the opposed second axle ends; a pair of non-motive wheels each comprising an inner surface and an outer surface and configured for radially extending rotatable disposition on the second axle hubs; and a pair of hub motor blanks each comprising a stator blank and a rotor blank, the stator blanks configured for selective attachment to and detachment from the second axle hubs, the rotor blanks configured for selective attachment to and detachment from the non-motive wheels, the rotor blanks configured for reversible non-motive rotation of the non-motive wheels by and about the stator blanks.

In another embodiment, a method of using a variable wheel drive electric vehicle is disclosed. The method of using a variable wheel drive electric vehicle comprises forming a variable wheel drive electric vehicle comprising: a vehicle chassis; a first axle disposed on the vehicle chassis, comprising: a pair of opposed first axle ends, the opposed first axle ends axially spaced apart along a first axle axis; a pair of first axle hubs attached to the first axle ends; a pair of motive wheels each comprising an inner surface and an outer surface and configured for radially extending rotatable disposition on the first axle hubs; and a pair of electric hub motors each comprising a stator and a rotor, the stators configured for selective attachment to and detachment from the first axle hubs, the rotors configured for selective attachment to and detachment from the motive wheels, the rotors configured for reversible motive rotation of the motive wheels by and about the stators; a second axle longitudinally spaced from the first axle and disposed on the vehicle chassis, comprising: a pair of opposed second axle ends, the opposed second axle ends axially spaced apart along a second axle axis; a pair of second axle hubs attached to the opposed second axle ends; a pair of non-motive wheels each comprising an inner surface and an outer surface and configured for radially extending rotatable disposition on the second axle hubs; and a pair of hub motor blanks each comprising a stator blank and a rotor blank, the stator blanks configured for selective attachment to and detachment from the second axle hubs, the rotor blanks configured for selective attachment to and detachment from the non-motive wheels, the rotor blanks configured for reversible motive rotation of the motive wheels by and about the stator blanks. The method of using a variable wheel drive electric vehicle also comprises detaching the electric hub motors from the first axle hubs and the motive wheels and detaching the hub motor blanks from the second axle hubs and the non-motive wheels, and attaching the electric hub motors to the second axle hub and the non-motive wheels which thereby become the motive wheels, and attaching the hub motor blanks to the first axle hub and the motive wheels which thereby become the non-motive wheels, whereby the motive wheels are moved from disposition along the first axle axis to disposition along the second axle axis and the non-motive wheels are moved from disposition along the second axle axis to disposition along the first axle axis; or detaching the motive wheels from the first axle hub and the non-motive wheels from the second axle hub and attaching the motive wheels to the second axle hub and the non-motive wheels to the first axle hub, whereby the motive wheels are moved from disposition along the first axle axis to disposition along the second axle axis and the non-motive wheels are moved from disposition along the second axle axis to disposition along the first axle axis.

In yet another embodiment, a method of using a variable wheel drive electric vehicle is disclosed. The method of using a variable wheel drive electric vehicle comprises forming a variable wheel drive electric vehicle comprising: a vehicle chassis; a first axle disposed on the vehicle chassis, comprising: a pair of opposed first axle ends, the opposed first axle ends axially spaced apart along a first axle axis; a pair of first axle hubs attached to the first axle ends; a pair of motive wheels each comprising an inner surface and an outer surface and configured for radially extending rotatable disposition on the first axle hubs; and a pair of electric hub motors each comprising a stator and a rotor, the stators configured for selective attachment to and detachment from the first axle hubs, the rotors configured for selective attachment to and detachment from the motive wheels, the rotors configured for reversible motive rotation of the motive wheels by and about the stators; a second axle longitudinally spaced from the first axle and disposed on the vehicle chassis, comprising: a pair of opposed second axle ends, the opposed second axle ends axially spaced apart along a second axle axis; a pair of second axle hubs attached to the opposed second axle ends; a pair of non-motive wheels each comprising an inner surface and an outer surface and configured for radially extending rotatable disposition on the second axle hubs; and a pair of hub motor blanks each comprising a stator blank and a rotor blank, the stator blanks configured for selective attachment to and detachment from the second axle hubs, the rotor blanks configured for selective attachment to and detachment from the non-motive wheels, the rotor blanks configured for reversible motive rotation of the motive wheels by and about the stator blanks. The method of using a variable wheel drive electric vehicle also comprises detaching the hub motor blanks from the second axle hubs and the non-motive wheels, and attaching a pair of additional electric hub motors, each additional hub motor comprising an additional stator and an additional rotor, the additional stators configured for selective attachment to and detachment from the second axle hubs, the additional rotors configured for selective attachment to and detachment from the non-motive wheels, by attaching the additional stators to the second axle hubs and attaching the additional rotors to the non-motive wheels which thereby become additional motive wheels configured for reversible motive rotation by and about the additional stators, wherein the variable wheel drive electric vehicle comprises an all-wheel drive vehicle; or detaching the non-motive wheels from the second axle hub, and attaching a pair of additional motive wheels to the second axle hub, the additional electric hub motors each comprising an additional stator and an additional rotor, the additional stators configured for selective attachment to and detachment from the second axle hubs, the additional rotors configured for selective attachment to and detachment from the additional motive wheels, the additional rotors configured for reversible motive rotation of the additional motive wheels by and about the additional stators, wherein the variable wheel drive electric vehicle comprises an all-wheel drive vehicle.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
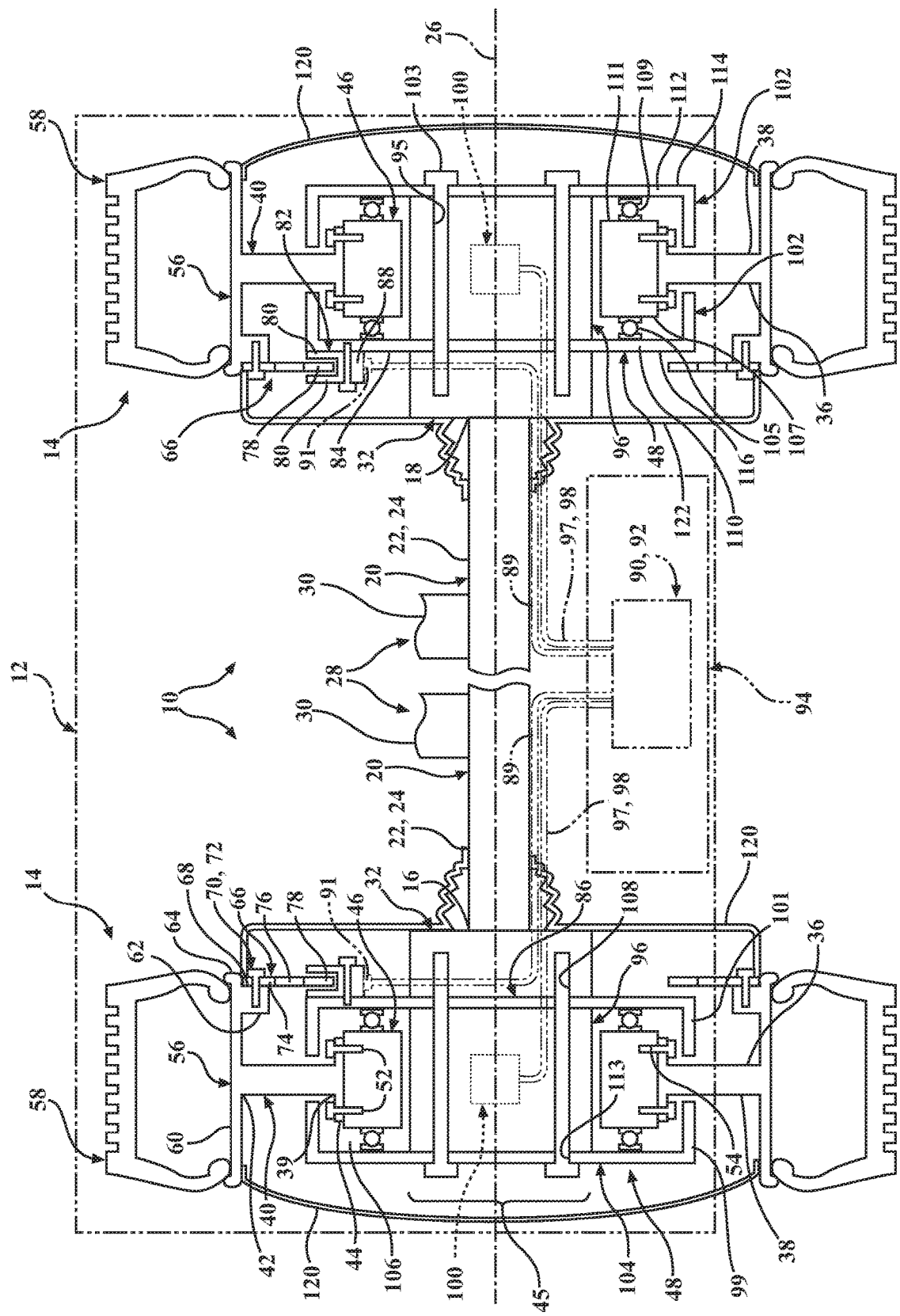
FIG. 1 is a schematic cross-sectional view of an embodiment of a variable wheel drive (VWD) electric vehicle and an axle comprising motive wheels and electric hub motors that may be selectively attached to and detached from the motive wheels, as described herein.

The present invention comprises a VWD electric vehicle that comprises motive wheels comprising selectively attachable and detachable electric hub motors. The motive wheels comprising selectively attachable and detachable hub motor are very advantageous because the wheels are configured so that the selectively attachable and detachable electric hub motors may be attached and detached from the outward facing side of the wheel. This provides more versatility and convenience in the service, repair, replacement, and upgrade of the selectively attachable and detachable electric hub motors. The selectively attachable and detachable electric hub motors can be removed in the course of operation and use, such as alongside a roadway, or in a driveway or street, without the need to visit a vehicle service facility. The selectively attachable and detachable electric hub motors can also advantageously be swapped between motive wheels and non-motive wheels to provide flexible vehicle configuration or reconfiguration and the variable wheel drive. The motive wheels themselves can also be switched with the non-motive wheels to provide flexible vehicle configuration or reconfiguration and the variable wheel drive. For example, the selectively attachable and detachable electric hub motors can also advantageously be swapped from motive wheels to non-motive wheels to change the motive wheels to non-motive wheels and vice versa, or similarly the motive wheels may be swapped with the non-motive wheels, to alter the drive type of the vehicle, such as from FWD that may be useful for certain uses or road conditions (e.g. city driving, short trips, slippery road conditions) to RWD that may be useful for different uses or road conditions (e.g. towing), or vice versa. Additional selectively attachable and detachable electric hub motors can also advantageously be added to an FWD or RWD configured vehicle to provide additional motive wheels creating an AWD or 4WD vehicle that may be useful for further different uses or road conditions (e.g. higher performance, off-road use, snow or ice road conditions, towing). Similarly, non-motive wheels may be detached from, and additional motive wheels may be attached to, an FWD or RWD configured vehicle to provide additional motive wheels creating an AWD or 4WD vehicle. These changes in vehicle drive configuration can be temporary or permanent. Thus, a vehicle that is normally configured for two wheel drive (2WD), such as for commuter or city driving, can be changed temporarily to an AWD or 4WD configuration for an event, such as a vacation or road trip or for off-road use, and then changed back to the 2WD configuration when the event is over.

The VWD electric vehicle comprises a vehicle chassis. The VWD electric vehicle comprises a first axle disposed on the vehicle chassis, comprising: a pair of opposed first axle ends, the opposed first axle ends axially spaced apart along a first axle axis; a pair of first axle hubs attached to the first axle ends, a pair of motive wheels each comprising an inner surface and an outer surface and configured for radially extending rotatable disposition on the first axle hubs, and a pair of electric hub motors each comprising a stator and a rotor, the stators configured for selective attachment to and detachment from the first axle hubs, the rotors configured for selective attachment to and detachment from the motive wheels, the rotors configured for reversible motive rotation of the motive wheels by and about the stators. The VWD electric vehicle also comprises a second axle longitudinally spaced from the first axle and disposed on the vehicle chassis, comprising: a pair of opposed second axle ends, the opposed second axle ends axially spaced apart along a second axle axis; a pair of second axle hubs attached to the opposed second axle ends; a pair of non-motive wheels each comprising an inner surface and an outer surface and configured for radially extending rotatable disposition on the second axle hubs; and a pair of hub motor blanks each comprising a stator blank and a rotor blank, the stator blanks configured for selective attachment to and detachment from the second axle hubs, the rotor blanks configured for selective attachment to and detachment from the non-motive wheels, the rotor blanks configured for reversible non-motive rotation of the non-motive wheels by and about the stator blanks.

As used herein, the terms front or frontward or forward or fore or rear or rearward or aft refer to the front or rear of the article or vehicle, or to a direction toward the front or rear of the article or vehicle, respectively. The terms longitudinal or along the length refers to a direction that extends along or generally parallel to an article or vehicle centerline between the front and the rear, or from one end to an opposed end. The terms transverse, lateral, or along the width, or left-right refers to a direction that is orthogonal, or substantially orthogonal, to the longitudinal direction. The terms up or upward or down or downward refer to the top or bottom of the article or vehicle, or to a direction substantially toward the top or bottom of the article or vehicle, respectively. The terms in or inner or inward refer to a direction toward the center of the article or vehicle, and out or outer or outward refers to the opposite direction away from the center or central portion of the article or vehicle. The term selectively attachable and detachable used in reference to a component indicates that a human user or operator may choose to attach or detach the component from the article or structure with which it is associated or related.

Figure 2:
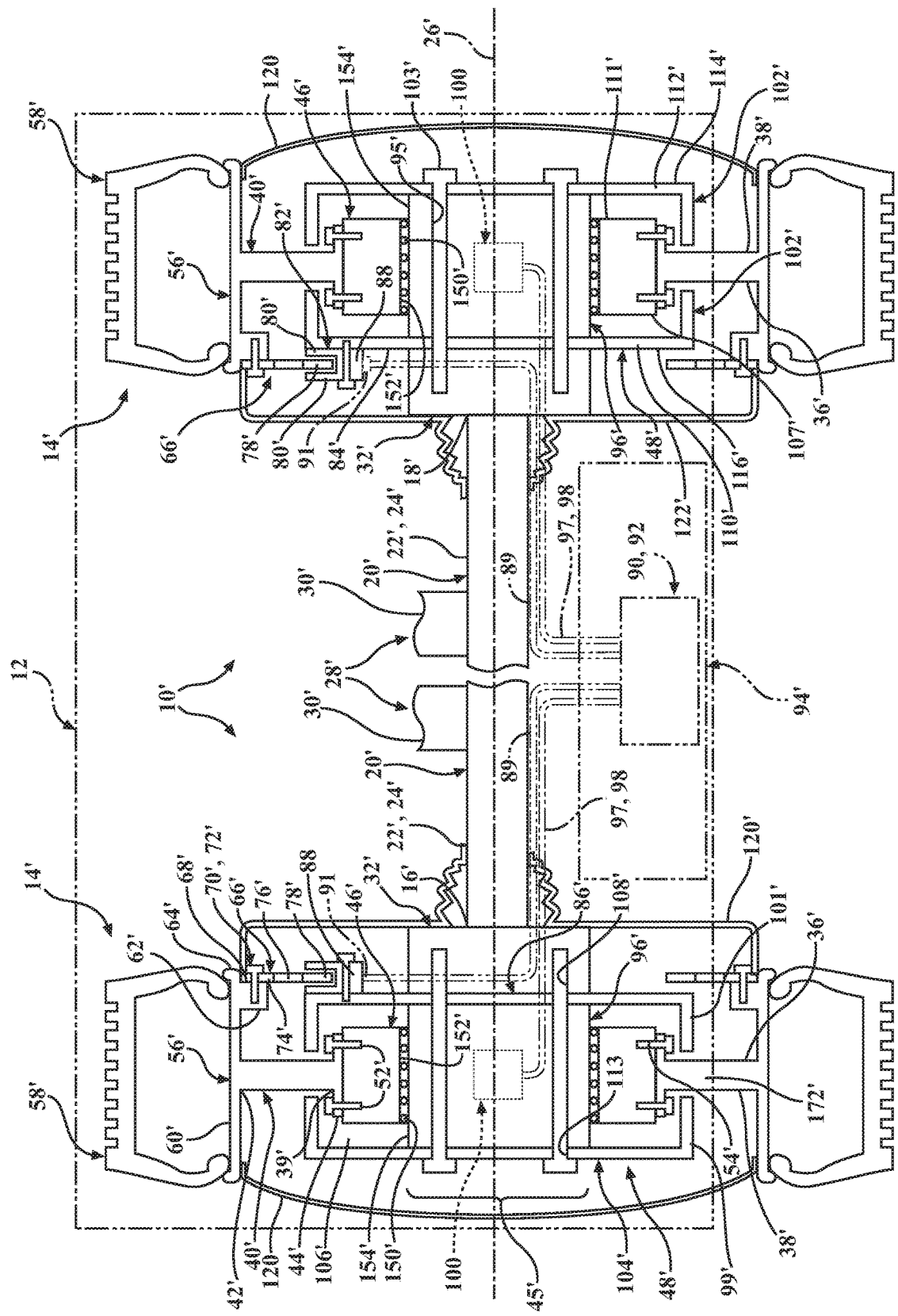
FIG. 2 is a schematic cross-sectional view of an embodiment of a VWD electric vehicle and an axle comprising non-motive wheels and hub motors blanks that may be selectively attached to and detached from the non-motive wheels, as described herein.
Figure 3:
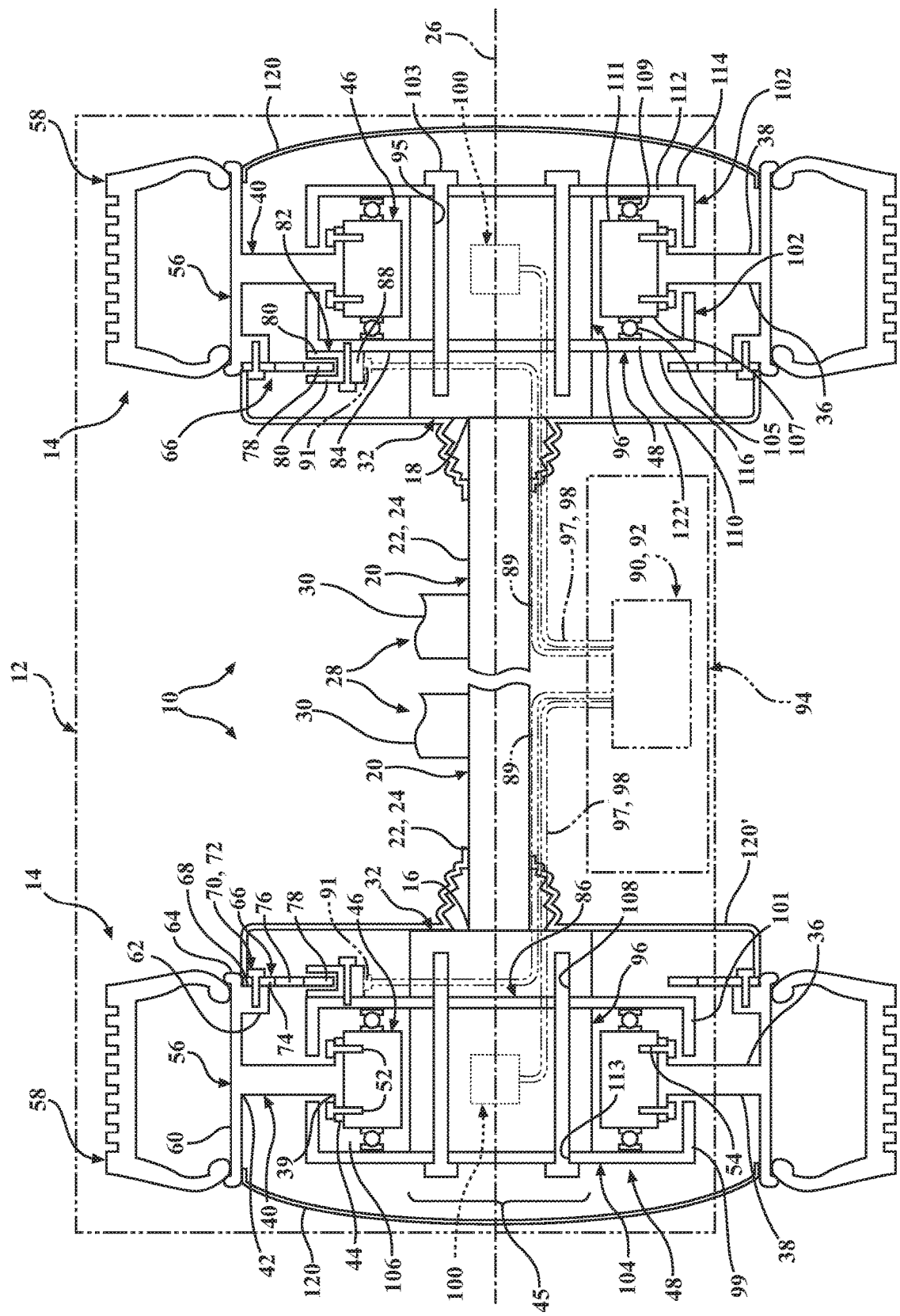
FIG. 3 is a schematic cross-sectional view of a second embodiment of a VWD electric vehicle and an axle comprising non-motive wheels and hub motors blanks that may be selectively attached to and detached from the non-motive wheels, as described herein.

Referring to the figures, and particularly to FIGS. 1-3, a VWD electric vehicle 12 extending along longitudinal axis 11 is disclosed. The VWD electric vehicle 12 comprises a modular axle and motive wheel system 10. The modular axle and motive wheel system 10 for the variable wheel drive electric vehicle 12 comprises a first axle 20 and a pair of motive wheels 14 disposed proximate opposite ends thereof, which may also be referred to as drive wheels. The VWD electric vehicle 12 may include any type of motorized wheeled vehicle in which vehicle movement is provided and supported on spaced apart rotatable motive wheels that are rotatably disposed on an axle. The first axle 20 may comprise a front axle, real axle, or front and rear axle of the VWD electric vehicle 12, as well as various additional or supplemental axles 20' as described herein, and motive wheels 14 may comprise steerable or non-steerable wheels.

The VWD electric vehicle 12 may include all manner of wheel vehicles, including various automotive vehicles, and including all manner of cars, sport and other types of utility vehicles (SUV's), and trucks, including light-duty, medium-duty, and heavy-duty trucks. The VWD electric vehicle 12 may also include all manner of recreational vehicles (RV's), all terrain vehicles (ATV's) and side-by-side vehicles, including utility or utility task vehicles (UTV's) and multi-purpose off-highway utility vehicles (MOHUV's). The VWD electric vehicle 12 may comprise an electric vehicle (EV), where all of the motive power of the vehicle wheels is provided by electric hub motors as described herein, or a hybrid electric vehicle where the motive power of some of the vehicle wheels is provided by electric hub motors as described herein.

The modular axle and motive wheel system 10 may be used on the VWD electric vehicle 12 in any desired manner or location, including as a front axle 13 (e.g. in an FWD vehicle 17), a rear axle 15 (e.g. in an RWD vehicle 19), or as a front axle 13 and rear axle 15 (e.g. in an AWD or 4WD vehicle 21).

The VWD electric vehicle 12 comprises a vehicle chassis 8. The vehicle chassis 8 may comprise any fixed portion of the VWD electric vehicle 12 configured for suitable for attachment of the first axle 20, or the vehicle suspension 28 to which the axle may be attached. The first axle 20 may be attached to the vehicle suspension 28 or the vehicle chassis 8 using known attachments, such as various threaded attachments, including threaded bolts and/or nuts. The vehicle chassis 8 may comprise the vehicle frame or body, particularly in vehicles that employ unibody construction, or a combination thereof.

The VWD electric vehicle 12 also comprises a pair of opposed first axle ends 16, 18 comprising a first axle 20. The first axle 20 may comprise any suitable type of axle. In one embodiment, the first axle 20 may include a continuous axle 22, including a solid axle or a hollow axle, that extends continuously between the first axle ends 16, 18. In another embodiment, the axle 20 comprises a pair of opposed spaced apart spindles 24 disposed on opposite sides of the VWD electric vehicle 12 that are axially aligned along a first axle axis 26. The opposed first axle ends 16, 18 are axially spaced apart along the first axle axis 26. Regardless of the type of first axle 20 employed, the axle is configured for operable attachment to a vehicle suspension 28, which may comprise all manner of conventional vehicle suspensions, including an independent suspension 30 that independently suspends the motive wheel 14 that it is operably attached to. The first axle 20 may comprise any of the axles claimed herein, and may be referred to alternately herein as a first axle or a second axle or a third axle. The first axle 20 is fixed and does not rotate about the first axle axis 26. The first axle 20 may be made from any suitable material including various metals, such as, for example, various steel, aluminum, magnesium, or titanium alloys.

The VWD electric vehicle 12 also comprises a pair of first axle hubs 32 attached to the first axle ends 16, 18. The first axle hubs 32 are cylindrical and are configured for attachment to the first axle 20 at the first axle ends 16, 18. The first axle hubs 32 may be attached to respective opposed first axle ends 16, 18 by any suitable attachment, including by the use of a threaded fastener or fasteners (e.g. threaded bolt or stud/nut, a weld, or a similar fixed or selectively attachable and detachable attachment. The first axle hubs 32 are fixed to the first axle ends 16, 18 and like the first axle 20 are non-rotatable. In one embodiment the first axle hubs 32 are generally cylindrical and may be made from any suitable high strength material including various metals, such as, for example, various steel, aluminum, magnesium, or titanium alloys.

The VWD electric vehicle 12 also comprises a pair of motive wheels 14 each comprising a first inner surface 36 and a second outer surface 38 and configured for radially extending rotatable disposition on respective first axle hubs 32. The motive wheels 14 comprise the drive wheels for propulsion of the VWD electric vehicle 12. The motive wheels 14 are rotatably disposed on the respective first axle hubs 32 in mirror image positions with the respective first inner surfaces 36 facing the first axle 20 and the respective first outer surfaces 38 facing away from the axle. The motive wheels 14 each comprise a wheel hub 40 that is generally cylindrical and extends radially outwardly away from the first axle axis 26. The wheel hub 40 comprises first inner surface 36, first outer surface 38, inner end 39, and outer end 42. The wheel hub 40 also comprises rotor flange 44 that extends axially outwardly away from the first inner surface 36 and the first outer surface 38 at inner end 39 and extends peripherally about a rotor opening 45 that is concentric about the first axle axis 26. The rotor flange 44 is configured for selectively attachable and detachable attachment of the rotor 46 of electric hub motor 48 that is disposed within rotor opening 45, such as, for example, by the attachment of a plurality of threaded fasteners 52 to the rotor 46 that are received through flange bores 54. The motive wheel 14 also comprises wheel rim 56 that is attached to the outer end 42 of wheel hub 40 and that extends axially outwardly away from the first inner surface 36 and the first outer surface 38 and is configured to receive a tire 58, such as a selectively inflatable and deflatable tire, in sealing engagement on a rim surface 60 in a conventional manner. The wheel rim 56 also comprises a brake rotor flange 62 that is attached to the wheel rim and extends radially inwardly toward the first axle axis 26 proximate inner rim end 64. The motive wheels 14, including the wheel hubs 40, wheel rims 56, and brake rotor flanges 62, and the elements and components thereof, may be formed from any suitable material, including various metals, such as, for example, various alloys of steel, aluminum, magnesium, and titanium.

The brake rotor flange 62 is configured for selective attachment and detachment of a brake rotor 66 to an inner side 68 using an attachment device 70. Any attachment device 70 suitable for selective attachment and detachment of the brake rotor may be used, such as, for example, a plurality of threaded brake rotor fasteners 72, including threaded bolts or a combination of threaded studs and threaded nuts.

The brake rotor 66 comprises a cylindrical ring 74 and a caliper portion 78 that is configured for selective frictional engagement and friction braking of the vehicle with selectively movable brake pads 80 of a brake caliper 82. The cylindrical ring 74 may optionally include a plurality of circumferentially spaced apart slots 76, such as circumferentially-extending radially spaced apart slots. The brake caliper 82 is configured for actuation as described herein to provide a braking action to the respective motive wheels 14. The brake caliper 82 is configured for selectively attachable and detachable attachment to the outer surface 84 of the inner portion 86 of the motor housing 102. The brake caliper 82 may be actuated to move the selectively moveable brake pads 80 inwardly and compress them against the caliper portion 78 by any suitable actuator, including a hydraulic actuator (not shown) or electrical brake actuator 88. Electrical brake actuator 88 may include any suitable electric actuator, including an electric motor or an electric solenoid and may be in signal and power communication by brake power bus 89 and brake connector 91 with any suitable vehicle controller 90, such as motor controller 92, for example, that is configured for controlled application of power from a vehicle power source or battery, such as, for example, the vehicle battery 94 to controllably actuate the first brake actuator 88 to provide a braking action by controllably compressing the brake caliper 82 and selectively movable brake pads 80 against the caliper portion 78 of brake rotor 76 as is known in the art. The vehicle battery 94 for the VWD electric vehicle 12 propulsion may comprise any suitable battery electrodes and electrolytes, including lithium-ion and lithium-ion polymer batteries.

The VWD electric vehicle 12 also comprises a pair of electric hub motors 48 that may be selectively attached and detached from the first axle hubs 32 and wheel hubs 40 as described herein, each comprising a non-rotatable stator 96 that has an axially-extending cylindrical shape and is configured to be fixed and stationary and non-rotatable, and a rotor 46 that is configured for selectively reversible rotation and is disposed radially outwardly of and concentric with the non-rotatable stator 96 and that also has an axially-extending cylindrical shape. In one embodiment, the non-rotatable stator 96 and rotor 46 comprise known components, design elements, and construction. The electric hub motor 48 may comprise any suitable type of outer rotation radial flux electric motor comprising a fixed non-rotatable stator 96 and a selectively and reversibly rotatable rotor 46, including various alternating current (AC) and direct current (DC) powered electric motors, including both brushed (BDC) and brushless (BLDC) motors. In one embodiment, the electric hub motor 48 comprises an AC electric motor and conventional power electronics including a current inverter and a voltage converter. The DC power and current from the vehicle battery 94 is converted to AC power and current using the power inverter and the voltage from the battery is stepped up to a high voltage (e.g. about 210 VDC to about 650 VAC) using the voltage converter. The power electronics may be disposed in the electric hub motor 48, particularly the non-rotatable stator 96, or elsewhere in the VWD electric vehicle 12, including as a part of a vehicle controller 90, including the motor controller 92, or as part of the vehicle battery 94, or on a standalone basis. The high voltage AC power may be supplied to the electric hub motor 48 by any suitable electrical power and/or signal communication device 97, such as a power bus 98 that comprises an electrical conductor configured to electrically communicate high voltage from the power electronics, which may be electrically connected to the electric hub motor 48 by any suitable electrical power attachment, including electrical connector 100.

In one embodiment, the non-rotatable stator 96 and rotor 46 are disposed within the motor housing 102 that is generally cylindrical and comprises an outer portion 104 and an opposed inner portion 86 that define the motor chamber 106 for housing the components of the electric hub motor 48, including the non-rotatable stator 96 and rotor 46. The outer portion 104 and opposed inner portion 86 may have any suitable shape to define the motor chamber 106. In various embodiments illustrated in FIG. 1, the outer portions 104 and opposed inner portions 86 comprise respective generally hollow cylinders of the same diameter that define outer sidewalls 99 and inner sidewalls 101 and respective outer bases 110 and inner bases 112 that are attached to and orthogonal to the respective sidewalls that enclose respective outer ends 114 and inner ends 116. Outer portions 104 and inner portions 86 define respective U-shaped cross sections. The outer portions 104 and opposed inner portions 86 are configured for placement in an opposing relationship with the outer bases 110 and inner bases 112 disposed away from one another. Placement of outer portions 104 and opposed inner portions 86 in an opposing relationship define the motor chambers 106 comprising a cylindrically shaped volume that is configured to house the cylindrical components of the electric hub motor 48 between them. The rotor 46 is rotatably disposed within the motor chamber 106 and non-rotatable housing 102, and with respect to the non-rotatable stator 96, between an inner bearing 105 disposed against an inner side 107 of the rotor and the outer base 110 and an outer bearing 109 disposed against an outer side 111 of the rotor and the inner base 112. The inner bearing 105 and outer bearing 109 rotatably support the rotation of the rotor 46 and the motive wheel 14 described herein.

The motor housings 102 and stators 96 are configured for selective attachment to and detachment from the first axle hubs 32 by any suitable stator attachment, such as, for example, a plurality of threaded hub fasteners 103, such as stator bolts and/or rotor studs (attached to the first axle hub 32) and nuts, that are disposed in a corresponding plurality of housing bores 113 that extend through the motor housing 102 and stator bores 95 that extend axially through the stators 96 and may be tightened into a corresponding plurality of threaded axle hub bores 108 to attach the motor housings 102 and stators 96 to the first axle hubs 32.

The rotors 46 are configured for selective attachment to and detachment from the wheel hubs 40 and rotor flanges 44 that extends axially outwardly away from the first inner surfaces 36 and the first outer surfaces 38 of the wheel hubs 40 The rotors 46 are configured for reversible motive rotation of the motive wheels 14 by and about the stators 96 by controlled application of power to the stators 96 from the motor controller 92 resulting in a selectively reversible rotational electromotive force against the rotors 46 that is configured to rotate the motive wheels 14 as is known in the art.

The electric hub motors 48 may be operated in a driving mode where power from the vehicle battery 94 is applied to the electric hub motors 48 and used for vehicle propulsion in a forward or reverse direction, a freewheeling mode where the electric hub motors are electrically disconnected from the battery, and a regenerative braking mode wherein a braking signal input causes the motor controller 92 to command operation of the electric hub motors in a reverse direction which slows the vehicle in its current direction of operation and causes generation of power for storage in the vehicle battery 94. In driving situations where regenerative braking in insufficient to provide sufficient stopping power for the vehicle, a vehicle controller 90, such as motor controller 92 may actuate the brake calipers 82 to provide additional stopping power from the friction brakes as described herein.

In one embodiment, the motive wheel 14 comprising the selectively attachable and detachable electric hub motor 48 may also comprises an outer wheel cover 120 configured for disposition, including sealable disposition, on the first outer surface 38 of the wheel hub 40 and/or the wheel rim 56 of the motive wheel 14, or similarly to the non-motive wheel 14' or any additional motive wheels 14', as described herein. The motive wheel 14 may also comprise an inner wheel cover 122 configured for disposition, including sealable disposition, on the first inner surface 36 of the wheel hub 40 and/or wheel rim 56 of the motive wheel 14, or similarly to the non-motive wheel 14' or any additional motive wheels 14', as described herein. In one embodiment, the outer wheel cover 116 is configured to enclose the cylindrical rotor 46, the cylindrical stator 78, and the non-rotatable axle 18, and the inner wheel cover 118 is configured to enclose the first axle hub 32 and the mechanical friction brake 98, and more particularly the outer wheel cover 120 and inner wheel cover 122 may be configured to sealingly enclose these components and portions of the motive wheels 14, non-motive wheels 14', and additional motive wheels 14⁺ to exclude water, dirt, salt, and other contaminants. In one embodiment, the inner wheel cover 122 comprises a flexible boot 124 disposed proximate the non-rotatable first axle 20.

Referring to FIGS. 2 and 3, the VWD electric vehicle 12 also comprises a second axle 20' longitudinally spaced from the first axle 20 and disposed on the vehicle chassis 8 in the same manner as the first axle 20, as described herein. The first axle 20 and second axle 20' may be the same and comprise the same construction and elements, or be different and comprise different construction and elements. For example, the first axle 20 may comprise steerable wheels and be steerable, and the second axle 20' may comprise non-steerable wheels and be non-steerable, or vice versa.

The VWD electric vehicle 12 also comprises a pair of opposed second axle ends 16', 18'. The opposed second axle ends 16', 18' are axially spaced apart along a second axle axis 26' and may be the same and comprise the same construction and elements as first axle ends 16, 18, or be different and comprise different construction and elements.

The VWD electric vehicle 12 also comprises a pair of second axle hubs 32' attached to the opposed second axle ends 16', 18'. The second axle hubs 32' may be the same and comprise the same construction and elements as first axle hubs 32, or be different and comprise different construction and elements.

The VWD electric vehicle 12 also comprises a pair of non-motive wheels 14' each comprising a second inner surface 36' and a second outer surface 38' and configured for radially extending non-motive rotatable disposition on respective first axle hubs 32. The non-motive wheels 14' comprise driven wheels of the VWD electric vehicle 12. The non-motive wheels 14' may have any suitable rotatable wheel construction and components. In certain embodiments, the non-motive wheels 14' may have the same elements and components as the motive wheels 14, except that they do not include the electric hub motors 48, including rotors 46 and stators 96 and their components. With the exception of rotor blanks 46' and stator blanks 96', all of the other components of non-motive wheels 14' may be the same as the other components of motive wheels 14, which is indicated herein by the use of an apostrophe after the element number. Rather, the non-motive wheels 14' comprise hub motor blanks 48' comprising rotor blanks 46' and stator blanks 96'. The hub motor blanks 48' comprising rotor blanks 46' and stator blanks 96' may have any suitable construction that provides non-motive rotatable disposition of the rotor blanks' 46 about the stator blanks 96'. In one embodiment, the rotor blanks 46' and the stator blanks 96' may have the same dimensions, profile, weight, and features as the rotors 46 and stators 96, respectively, and in one embodiment may be formed from a metal, such as various steel, aluminum, magnesium, and titanium alloys.

The non-motive wheels 14' are rotatably disposed on the respective second axle hubs 32' in mirror image positions with the respective first inner surfaces 36 facing the second axle 20' and the respective second outer surfaces 38' facing away from the axle. The non-motive wheels 14' each comprise a wheel hub 40' that is generally cylindrical and extends radially outwardly away from the second axle axis 26'. The wheel hub 40' comprises second inner surface 36', second outer surface 38', inner end 39', and outer end 42'. The wheel hub 40' also comprises rotor flange 44' that extends axially outwardly away from the second inner surface 36' and the second outer surface 38' at inner end 39' and extends peripherally about a rotor opening 45' that is concentric about the second axle axis 26'. The rotor flange 44' is configured for selectively attachable and detachable attachment of the rotor blanks 46' of hub motor blank 48' that is disposed within rotor opening 45', such as, for example, by the attachment of a plurality of threaded fasteners 52' to the rotor blank 46' that are received through flange bores 54'. The non-motive wheel 14' also comprises wheel rim 56' that is attached to the outer end 42' of wheel hub 40' and that extends axially outwardly away from the second inner surface 36' and the second outer surface 38' and is configured to receive a tire 58', such as a selectively inflatable and deflatable tire, in sealing engagement on a rim surface 60' in a conventional manner. The wheel rim 56' also comprises a brake rotor flange 62' that is attached to the wheel rim and extends radially inwardly toward the second axle axis 26' proximate inner rim end 64'. The non-motive wheels 14', including the wheel hubs 40', wheel rims 56', and brake rotor flanges 62', and the elements and components thereof, may be formed from any suitable material, including various metals, such as, for example, various alloys of steel, aluminum, magnesium, and titanium.

The brake rotor flange 62' is configured for selective attachment and detachment of a brake rotor 66' to an inner side 68' using an attachment device 70'. Any attachment device 70' suitable for selective attachment and detachment of the brake rotor 66' may be used, such as, for example, a plurality of threaded brake rotor fasteners 72', including threaded bolts or a combination of threaded studs and threaded nuts.

The brake rotor 66' comprises a cylindrical ring 74' and a caliper portion 78' that is configured for selective frictional engagement and friction braking of the vehicle with selectively movable brake pads 80' of a brake caliper 82'. The cylindrical ring 74' may optionally include a plurality of circumferentially spaced apart slots 76', such as circumferentially-extending radially spaced apart slots. The brake caliper 82' is configured for actuation as described herein to provide a braking action to the respective non-motive wheels 14'. The brake caliper 82' is configured for selectively attachable and detachable attachment to the outer surface 84' of the inner portion 86' of the motor blank housing 102'. The brake caliper 82' may be actuated to move the selectively moveable brake pads 80' inwardly and compress them against the caliper portion 78' by any suitable second brake actuator 88', including a hydraulic actuator (not shown) or electrical second brake actuator 88'. Second brake actuator 88' may include any suitable electric actuator, including an electric motor or an electric solenoid and may be in signal and power communication by brake power bus 89 and brake connector 91 with any suitable vehicle controller 90, such as motor controller 92, for example, that is configured for controlled application of power from a vehicle power source or battery, such as, for example, the vehicle battery 94 to controllably actuate the second brake actuator 88' to provide a braking action by controllably compressing the brake caliper 82' and selectively movable brake pads 80' against the caliper portion 78' of brake rotor 76' as is known in the art. Although the hub motor blank 48' is unpowered and the non-rotatable stator blank 96' does not include the electrical circuits and electrical connections of the non-rotatable stator 96 as explained herein, the high voltage AC power may be supplied to the hub motor blank 48' by any suitable electrical power and/or signal communication device 97, such as a power bus 98 that comprises an electrical conductor configured to electrically communicate high voltage from the power electronics, which may be electrically connected to the hub motor blank 48' by any suitable electrical power attachment, including electrical connector 100. This provides the flexibility necessary to move the electric hub motors 48 and/or motive wheels 14 from first axle 20 to second axle 20', or vice versa, as described herein.

The VWD electric vehicle 12 also comprises a pair of hub motor blanks 48' that may be selectively attached and detached from the second axle hubs 32' and wheel hubs 40' as described herein, each comprising a non-rotatable stator blank 96' that has an axially-extending cylindrical shape and is configured to be fixed and stationary and non-rotatable, and a rotor blank 46' that is configured for selectively reversible rotation and is disposed radially outwardly of and concentric with the non-rotatable stator blank 96' and that also has an axially-extending cylindrical shape. In one embodiment, the non-rotatable stator blank 96' and rotor blank 46' comprise known components, design elements, and construction.

In one embodiment, the stator blank 96' and rotor blank 46' are disposed within the motor blank housing 102' that is generally cylindrical and comprises an outer portion 104' and an opposed inner portion 86' that define the motor blank chamber 106' for housing the components of the hub motor blank 48', including the stator blank 96' and rotor blank 46'. The outer portion 104' and opposed inner portion 86' may have any suitable shape to define the motor blank chamber 106'. In various embodiments illustrated in FIG. 1, the outer portions 104' and opposed inner portions 86' comprise respective generally hollow cylinders of the same diameter that define outer sidewalls 99' and inner sidewalls 101' and respective outer bases 110' and inner bases 112' that are attached to and orthogonal to the respective sidewalls that enclose respective outer ends 114' and inner ends 116'. Outer portions 104' and inner portions 86' define respective U-shaped cross sections. The outer portions 104' and opposed inner portions 86' are configured for placement in an opposing relationship with the outer bases 110' and inner bases 112' disposed away from one another. Placement of outer portions 104' and opposed inner portions 86' in an opposing relationship define the motor blank chambers 106' comprising a cylindrically shaped volume that is configured to house the cylindrical components of the hub motor blank 48' between them.

In the embodiment of FIG. 2, the rotor blank 46' is rotatably disposed within the motor blank chamber 106' and motor blank housing 102' which is non-rotatable, and with respect to the non-rotatable stator blank 96', by a circumferentially extending bearing 150' disposed between an inner diameter 152' of the rotor blank 46' and an outer diameter 154' of the stator blank 96'.

In the embodiment of FIG. 3, the rotor blank 46' is rotatably disposed within the motor blank chamber 106' and motor blank housing 102' which is non-rotatable, and with respect to the non-rotatable stator 96', between an inner bearing 105' disposed against an inner side 107' of the rotor and the outer base 110' and an outer bearing 109' disposed against an outer side 111' of the rotor and the inner base 112'. The inner bearing 105' and outer bearing 109' rotatably support the rotation of the rotor blank 46' and the non-motive wheel 14' as described herein.

The motor blank housings 102' and stators blanks 96' are configured for selective attachment to and detachment from the second axle hubs 32' by any suitable stator attachment, such as, for example, a plurality of hub blank fasteners 103', such as threaded stator blank bolts and/or threaded rotor blank studs (attached to the second axle hub 32') and nuts, that are disposed in a corresponding plurality of housing bores 113' that extend through the motor blank housing 102' and stator bores 95' that extend axially through the stators 96' and may be tightened into a corresponding plurality of threaded axle hub bores 108' to attach the motor blank housings 102' and stators 96' to the second axle hubs 32'.

The rotor blanks 46' are configured for selective attachment to and detachment from the wheel hubs 40' and rotor flanges 44' that extends axially outwardly away from the second inner surfaces 36' and the second outer surfaces 38' of the wheel hubs 40'. The rotors blanks 46' are configured for reversible non-motive rotation of the non-motive wheels 14' by and about the stators 96.

The VWD electric vehicle 12 of FIG. 1 is very advantageous because the motive wheels 14 and the electric hub motors 48, including both the stators 96 and rotors 46, can be removed from the exterior of the VWD electric vehicle 12 and the outward facing side of the motive wheels 14. Therefore, the tires 58 and the electric hub motors 48 and their components may be more easily serviced by a human user without the need to access the inward facing side of the motive wheel 14 while the wheel is attached to the vehicle, or to get under the vehicle, or to elevate the vehicle. This greatly simplifies routine repair and replacement service of any or all of the components of the motive wheels 14, particularly the tires 58, electric hub motors 48, wheel hubs 40, and wheel rims 56 in the event of damage or failure. It also greatly simplifies performance upgrades of the motive wheels 14, including replacing the tires 58, electric hub motors 48, wheel hubs 40, and wheel rims 56 with higher performance counterparts, such as, for example, a new or replacement hub motor 48 that provides a higher torque output than an original inner hub motor, or that consumes less power to provide an equivalent torque output and or another motor performance characteristic (i.e. is more efficient).

In one embodiment of the VWD electric vehicle 12 the electric hub motors 48 and the hub motor blanks 48' are configured for attachment to the first axle hub 32 and the second axle hub 32', respectively, by a plurality of hub fasteners 103 and hub blank fasteners 103' that extend through the motor housings 102 and electric hub motors 48, and the motor blank housings 102' and hub motor blanks 48', respectively.

It will be understood that detachment and attachment or reattachment of the electric hub motors 48, hub motor blanks 48', and additional electric hub motors 48+ also requires detachment of the necessary electrical power and signal connections necessary to power and control the electric hub motors, and that are attached to the hub motor blanks by, for example, detachment and reattachment of electrical connectors 100. Similarly, it will be understood that detachment and attachment or reattachment of the motive wheels 14, non-motive wheels 14', and additional wheels 14' also requires detachment of the necessary electrical power and signal connections necessary to power and control the electric hub motors 48 and additional electric hub motors 48', and that are attached to the hub motor blanks 48' by, for example, detachment and reattachment of electrical connectors 100. Further, it will be understood that detachment and attachment or reattachment of the motive wheels 14, non-motive wheels 14', and additional motive wheels 14' also requires detachment of the necessary brake power and signal connections necessary to power and control the brake actuators 88 by, for example, detachment and reattachment of brake connectors 91.

Referring to FIGS. 1-4, in one embodiment of the VWD electric vehicle 12 the first axle 20, or first axle, comprises a front axle 13 and the second axle 20' comprises a rear axle 15, and the VWD electric vehicle 12 comprises an FWD vehicle 17. In one embodiment of the FWD vehicle 17 as illustrated generally in FIG. 4, the electric hub motors 48 are configured for detachment from the first axle hubs 32 and motive wheels 14, the hub motor blanks 48' are configured for detachment from the second axle hubs 32', and non-motive wheels 14', the electric hub motors 48 are configured for attachment (i.e. reattachment) to the second axle hubs 32' and the non-motive wheels 14' which thereby become motive wheels 14, and the hub motor blanks 48' are configured for attachment to the first axle hubs 32 and motive wheels 14 which thereby become non-motive wheels 14', and wherein the VWD electric vehicle 12 is converted from FWD vehicle 17 to an RWD vehicle 19. In another embodiment of the FWD vehicle 17 as also illustrated generally in FIG. 4, the motive wheels 14 are configured for detachment from the first axle hubs 32 and the non-motive wheels 14' are configured for detachment from the second axle hubs 32'. The motive wheels 14 are configured for attachment or reattachment to the second axle hubs 32', and the non-motive wheels 14' are configured for attachment or reattachment to the first axle hubs 32, wherein the VWD electric vehicle 12 is configured to be converted from FWD vehicle 17 to an RWD vehicle 19.

Referring to FIGS. 1-4 and 6, in one embodiment of the VWD electric vehicle 12 the first axle 20, or first axle, comprises a front axle 13 and the second axle 20' comprises a rear axle 15, and the VWD electric vehicle 12 comprises an FWD vehicle 17. In one embodiment of the FWD vehicle 17 as illustrated generally in FIG. 6, the VWD electric vehicle 12 further comprises a pair of additional electric hub motors 48+ each comprising an additional stator 96+ and an additional rotor 46+, the additional stators are configured for selective attachment to and detachment from the second axle hubs 32', the additional rotors 48+ are configured for selective attachment to and detachment from the non-motive wheels 14', and wherein upon detachment of the stator blanks and rotor blanks and attachment of the additional stators and the additional rotors, the non-motive wheels 14' are converted to additional motive wheels 14+, and the VWD electric vehicle 12 is converted from the FWD vehicle 17 to an AWD or 4WD vehicle 21. Referring again to FIGS. 1-4 and 6, in another embodiment of the VWD electric vehicle 12 the first axle 20, or first axle, comprises a front axle 13 and the second axle 20' comprises a rear axle 15, and the VWD electric vehicle 12 comprises an FWD vehicle 17. In another embodiment of the FWD vehicle 17 as also illustrated generally in FIG. 6, the VWD electric vehicle 12 further comprises a pair of additional motive wheels 14+ each comprising an additional inner surface 36+ and an additional outer surface 38+ and configured for radially extending rotatable motive disposition on the second axle hubs 32', wherein upon detachment of the non-motive wheels 14' from the second axle hubs 32' and attachment of the additional motive wheels 14+ to the second axle hubs 32' the VWD electric vehicle 12 is converted from the FWD vehicle 17 to an AWD or 4WD vehicle 21. The additional motive wheels 14+ comprise a pair of additional electric hub motors 48+, each comprising an additional stator 96+ and an additional rotor 46+. The additional stators are configured for selective attachment to and detachment from the second axle hubs 32', the additional rotors 48+ are configured for selective attachment to and detachment from the additional motive wheels 14+.

The additional motive wheels 14+ and the additional electric hub motors 48+, and their components, including additional rotors 46+ and additional stators 96+, may be the same as, including identical to, the motive wheels 14 and electric hub motors 48, including rotors 46 and stators 96 and their components, or they may be different. For example, the additional motive wheels 14+ and additional electric hub motors $48^+$ may be configured to provide the same torque output as motive wheels 14 and electric hub motors 48, or they may be configured to provide a different torque output, either greater or lesser. The additional electric hub motors $48^+$ may be controlled and operated in the same manner as motive wheel 14 using any suitable vehicle controller 90, including motor controller 92.

Referring to FIGS. 1-3 and 5, in one embodiment of the VWD electric vehicle 12 the first axle 20, or first axle, comprises a rear axle 15 and the second axle 20' comprises a front axle 13, and the VWD electric vehicle 12 comprises an RWD vehicle 19. In one embodiment of the RWD vehicle 19 as illustrated generally in FIG. 5, the electric hub motors 48 are configured for detachment from the first axle hubs 32 and motive wheels 14, the hub motor blanks 48' are configured for detachment from the second axle hubs 32', and the non-motive wheels 14', the electric hub motors 48 are configured for attachment (i.e. reattachment) to the second axle hubs 32' and the non-motive wheels 14' which thereby become motive wheels 14, and the hub motor blanks 48' are configured for attachment to the first axle hubs 32 and motive wheels 14 which thereby become non-motive wheels 14', and wherein the VWD electric vehicle 12 is converted from RWD vehicle 19 to an FWD vehicle 17. In another embodiment of the RWD vehicle 19 as also illustrated generally in FIG. 5, the motive wheels 14 are configured for detachment from the first axle hubs 32 and the non-motive wheels 14' are configured for detachment from the second axle hubs 32'. The motive wheels 14 are configured for attachment or reattachment to the second axle hubs 32', and the non-motive wheels 14' are configured for attachment or reattachment to the first axle hubs 32, wherein the VWD electric vehicle 12 is configured to be converted from RWD vehicle 19 to an FWD vehicle 17.

Referring to FIGS. 1-3, 5, and 7, in one embodiment of the VWD electric vehicle 12 the first axle 20, or first axle, comprises a rear axle 15 and the second axle 20' comprises a front axle 13, and the VWD electric vehicle 12 comprises an RWD vehicle 19. In one embodiment of the RWD vehicle 19 as illustrated generally in FIG. 7, the VWD electric vehicle 12 further comprises a pair of additional electric hub motors $48^+$ each comprising a non-rotatable additional stator $96^+$ and an additional rotor $46^+$, the additional stators are configured for selective attachment to and detachment from the second axle hubs 32', the additional rotors $48^+$ are configured for selective attachment to and detachment from the non-motive wheels 14', and wherein upon detachment of the stator blanks and rotor blanks and attachment of the additional stators and the additional rotors, the non-motive wheels 14' are converted to additional motive wheels $14^+$, and the VWD electric vehicle 12 is converted from the RWD vehicle 19 to an AWD or 4WD vehicle 21. Referring again to FIGS. 1-3, 5, and 7, in another embodiment of the VWD electric vehicle 12 the first axle 20, or first axle, comprises a rear axle 15 and the second axle 20' comprises a front axle 13, and the VWD electric vehicle 12 comprises an RWD vehicle 19. In another embodiment of the RWD vehicle 19 as also illustrated generally in FIG. 7, the VWD electric vehicle 12 further comprises a pair of additional motive wheels $14^+$ each comprising an additional inner surface $36^+$ and an additional outer surface $38^+$ and configured for radially extending rotatable motive disposition on the second axle hubs 32', wherein upon detachment of the non-motive wheels 14' from the second axle hubs 32' and attachment of the additional motive wheels $14^+$ to the second axle hubs 32' the VWD electric vehicle 12 is converted from the RWD vehicle 19 to an AWD or 4WD vehicle 21. The additional motive wheels $14^+$ comprise a pair of additional electric hub motors $48^+$, each comprising an additional stator $96^+$ and an additional rotor $46^+$. The additional stators are configured for selective attachment to and detachment from the second axle hubs 32', the additional rotors $48^+$ are configured for selective attachment to and detachment from the additional motive wheels $14^+$.

Referring to FIGS. 8-13, in certain embodiments the VWD electric vehicle 12 comprises a third axle 20" disposed on the vehicle chassis 8. The third axle 20" may comprise a plurality of spaced apart third axles 20". The third axle 20" may be the same as axle 20 or second axle 20', including all of the buses and connectors and suspension components associated therewith, or may be different. For example, in certain embodiments the third axle 20" may be longer in order to dispose additional motive wheels $14^+$ or non-motive wheels 14' outward of and spaced away from the vehicle chassis 8, since the vehicle chassis 8 may or may not have wheel wells formed therein to accommodate the additional motive wheels 14+ or non-motive wheels 14'. The third axle 20" may be attached to the VWD electric vehicle 12 in any manner, including during vehicle assembly or afterward as an aftermarket accessory.

The third axle 20" (or each of the axles) comprises a pair of opposed third axle ends 16", 18". The opposed third axle ends 16", 18" are axially spaced apart along a third axle axis 26". The third axle 20" also comprises a pair of third axle hubs 32" attached to the third axle ends 16", 18", wherein the third axle is disposed between the front axle 13 (e.g. first axle 20) and the rear axle 15 (e.g. first axle 20), or wherein the third axle is disposed outward of the front axle or the rear axle.

Referring to FIGS. 8-13, in certain embodiments that include the third axle 20" or axles, the VWD electric vehicle 12 also comprises a pair of additional motive wheels $14^+$ for each third axle 20" as described above, each comprising an additional inner surface $36^+$ and an additional outer surface $38^+$ and configured for radially extending rotatable disposition on the third axle hubs 32". The additional motive wheels $14^+$ also comprise additional electric hub motors $48^+$ as described herein.

Figure 8:
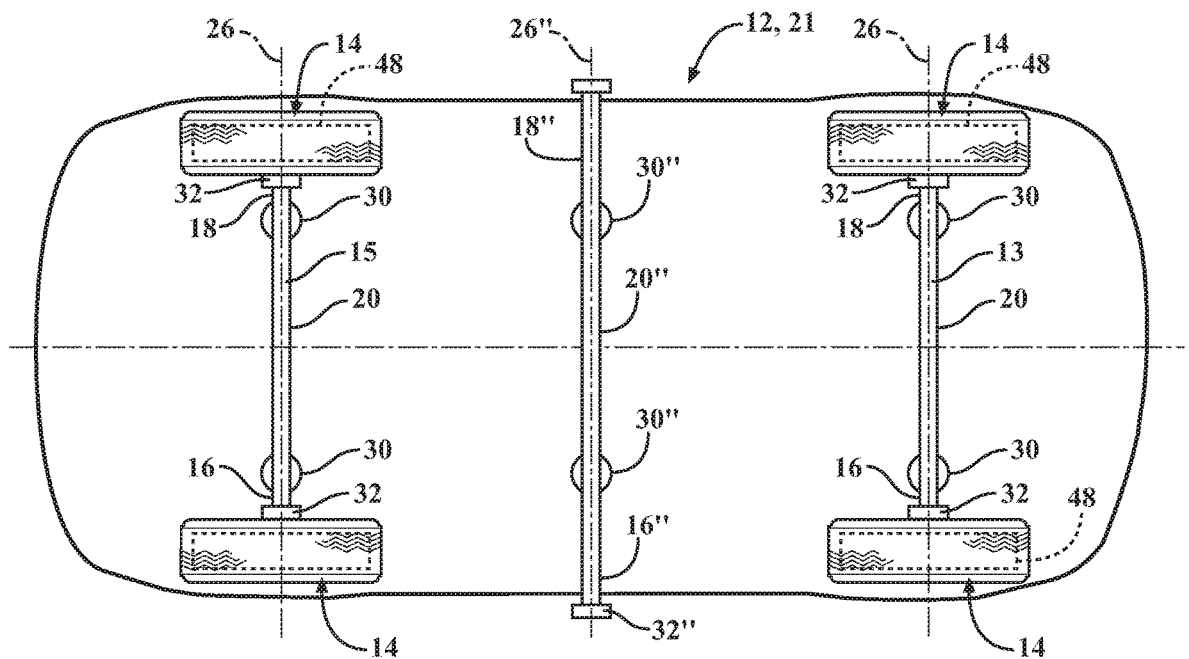
FIG. 8 is a schematic bottom view of an embodiment of an electric vehicle configured for AWD or 4WD comprising a pair of motive wheels and selectively attachable and detachable electric hub motors that comprise a front axle and pair of motive wheels and selectively attachable and detachable electric hub motors that comprise a rear axle, and also having a third axle disposed thereon between the front and rear axles, as described herein, as well as a method of using an electric vehicle by disposing a third axle configured to receive a pair of selectively attachable and detachable additional motive wheels between the front and rear axles.
Figure 9:
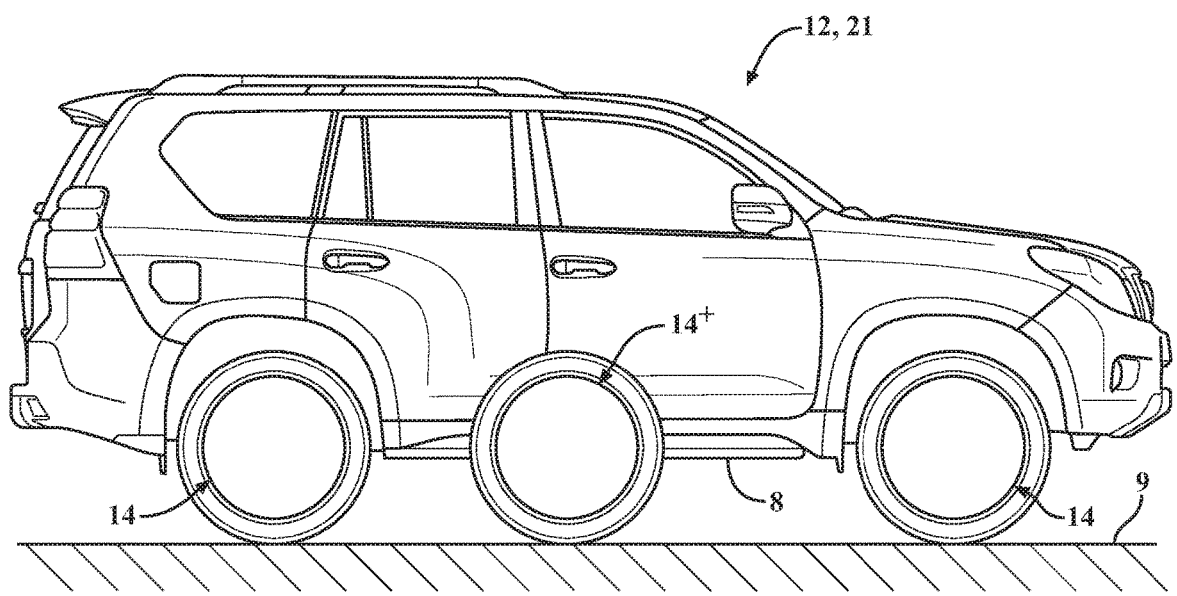
FIG. 9 is a schematic side view of the vehicle of FIG. 8 with a pair of selectively attachable and detachable additional motive wheels attached between the front and rear axles.

Referring to FIGS. 8 and 9, in one embodiment, the VWD electric vehicle 12 comprises an AWD or 4WD vehicle 21 and the third axle 20" is disposed on the vehicle chassis 8 between the front axle 13 and the rear axle 15 (FIG. 8). The VWD electric vehicles 12 configured to receive the third axle 20" configurations described herein in FIGS. 8-13, however, can include any of the drive configurations disclosed herein, including the FWD vehicle 17 (FIG. 4) and RWD vehicle 19 (FIG. 5). In the embodiment of FIG. 9, the third axle 20" comprises a pair of additional motive wheels $14^+$ as described herein attached to the third axle 20". The VWD electric vehicle 12 comprises a 6 wheel AWD vehicle 23.

Figure 10:
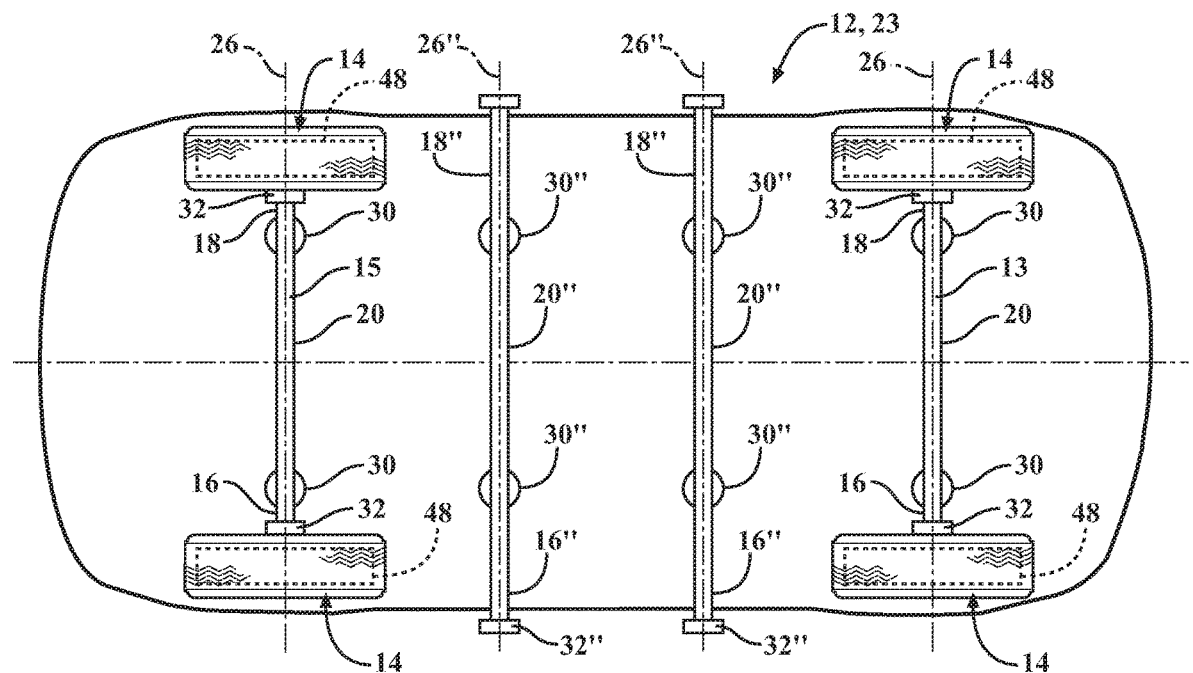
FIG. 10 is a schematic bottom view of an embodiment of an electric vehicle configured for AWD or 4WD comprising a pair of motive wheels and selectively attachable and detachable electric hub motors that comprise a front axle and pair of motive wheels and selectively attachable and detachable electric hub motors that comprise a rear axle, and also having a plurality of axles (e.g. a third axle and a fourth axle) disposed thereon between the front and rear axles, as described herein, as well as a method of using an electric vehicle by disposing a plurality of axles (e.g. a third axle and a fourth axle) that are configured to each receive a pair of selectively attachable and detachable additional motive wheels between the front and rear axles.
Figure 11:
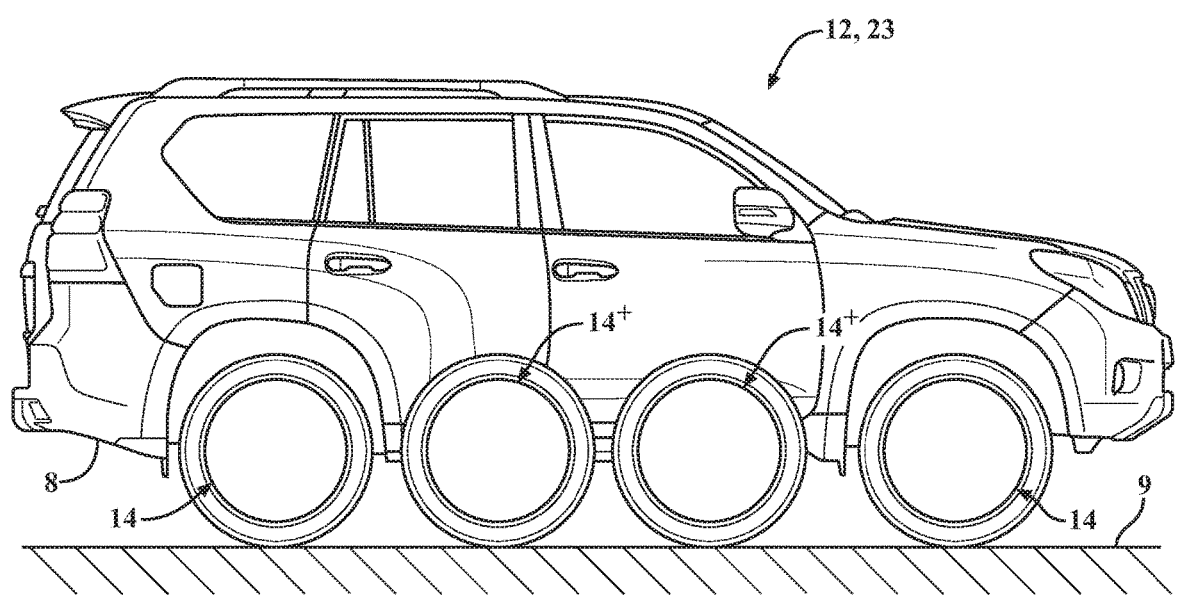
FIG. 11 is a schematic side view of the vehicle of FIG. 10 with two pair of selectively attachable and detachable additional motive wheels attached between the front and rear axles.

Referring to FIGS. 10 and 11 in one embodiment, the VWD electric vehicle 12 comprises an AWD or 4WD vehicle 21 and two third axles 20" are disposed on the vehicle chassis 8 between the front axle 13 and the rear axle 15 (FIG. 10). In the embodiment of FIG. 11a, the third axles 32" comprise two pair of additional motive wheels $14^+$ as described herein attached to the third axles 32". The VWD electric vehicle 12 comprises an 8 wheel AWD vehicle 25 and may be incorporated into any of the vehicle types described herein.

Figure 12:
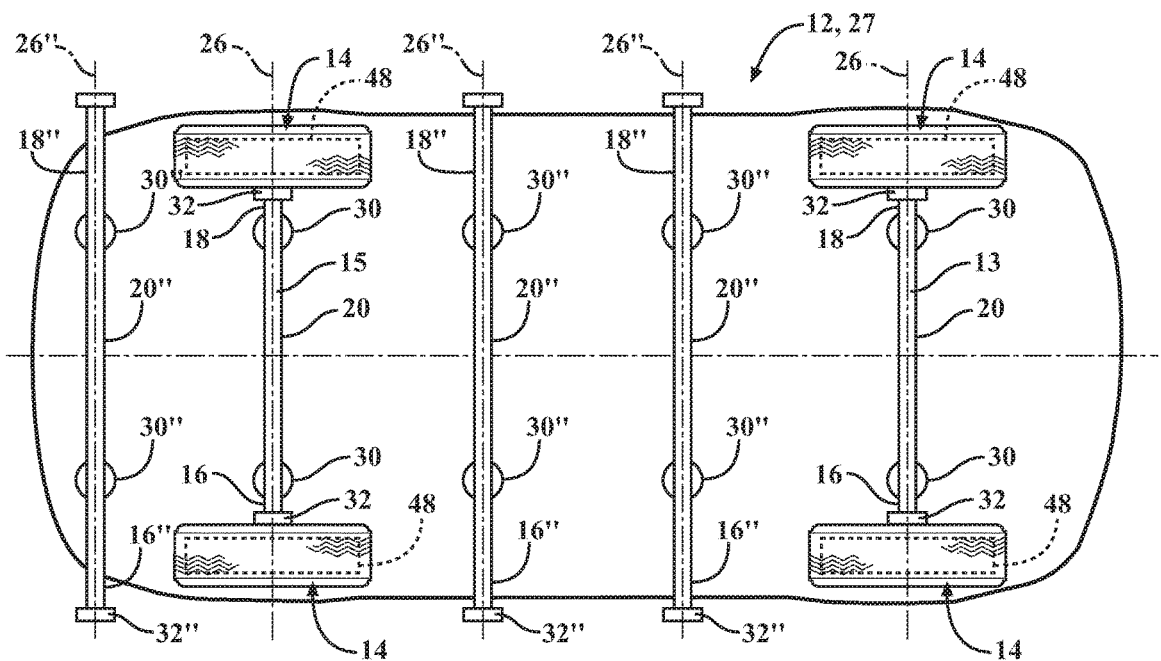
FIG. 12 is a schematic bottom view of an embodiment of an electric vehicle configured for AWD or 4WD comprising a pair of motive wheels and selectively attachable and detachable electric hub motors that comprise a front axle and pair of motive wheels and selectively attachable and detachable electric hub motors that comprise a rear axle, and also having a plurality of axles (e.g. a third axle and a fourth axle) disposed thereon between the front and rear axles and an axle (e.g. a fifth axle) disposed outward (e.g. forward or rearward) of the front axle or rear axle, as described herein, as well as a method of using an electric vehicle by disposing a plurality of axles (e.g. a third axle and a fourth axle) that are configured to each receive a pair of selectively attachable and detachable additional motive wheels between the front and rear axles and an axle that is disposed outward of the front axle or rear axle.
Figure 13:
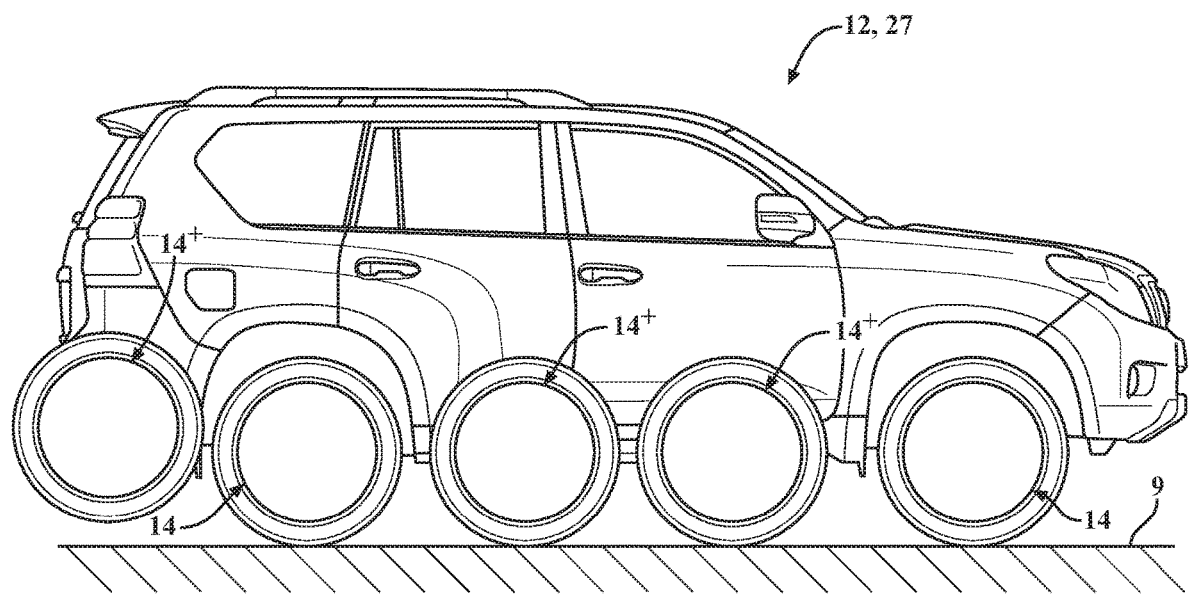
FIG. 13 is a schematic side view of the vehicle of FIG. 12 with two pair of selectively attachable and detachable additional motive wheels attached between the front and rear axles, and a pair or selectively attachable and detachable additional motive wheels attached outward of the front axle or rear axle (e.g. outward of the rear axle)

Referring to FIGS. 12 and 13 in one embodiment, the VWD electric vehicle 12 comprises an AWD or 4WD vehicle 21 with three third axles 20". Two third axles 32" are disposed on the vehicle chassis 8 between the front axle 13 and the rear axle 15 and one third axle 20" is disposed outward of the second (FIG. 12). In the embodiment of FIG. 13, the third axles 32" comprise three pair of additional motive wheels 14⁺ as described herein attached to the third axles 32". The VWD electric vehicle 12 comprises a 10 wheel AWD vehicle 27. The embodiments of FIGS. 8-13 are only examples, and the VWD electric vehicle 12 may include any number of third axles 32" and a corresponding number of pairs of additional motive wheels 14⁺. These VWD electric vehicles 12 afford multi-axle configurations that enable many useful off-road vehicle configurations, including vehicle configurations with multiple third axles that provide tank-like performance due to the additional motive wheels 14⁺ vehicles, as well as those adapted to hill climbing with additional motive wheels 14⁺ disposed outward of the rear axle 15 and those with ditch or ravine traversing capabilities with additional motive wheels 14⁺ disposed outward of the front axle 13. The incorporation of additional motive wheels 14⁺ also increases the torque output and tractive effort with the ground 9 of the VWD electric vehicles 12 for all purposes and on all ground types (e.g. asphalt and concrete roadways, gravel roads, dirt roads, and various off-road earth surface types (e.g. sand, mud, ice, snow) and conditions (e.g. wet, dry, ice covered, snow covered, debris covered), including towing, off-road uses, and high performance (e.g. more rapid acceleration) uses.

Figure 14:
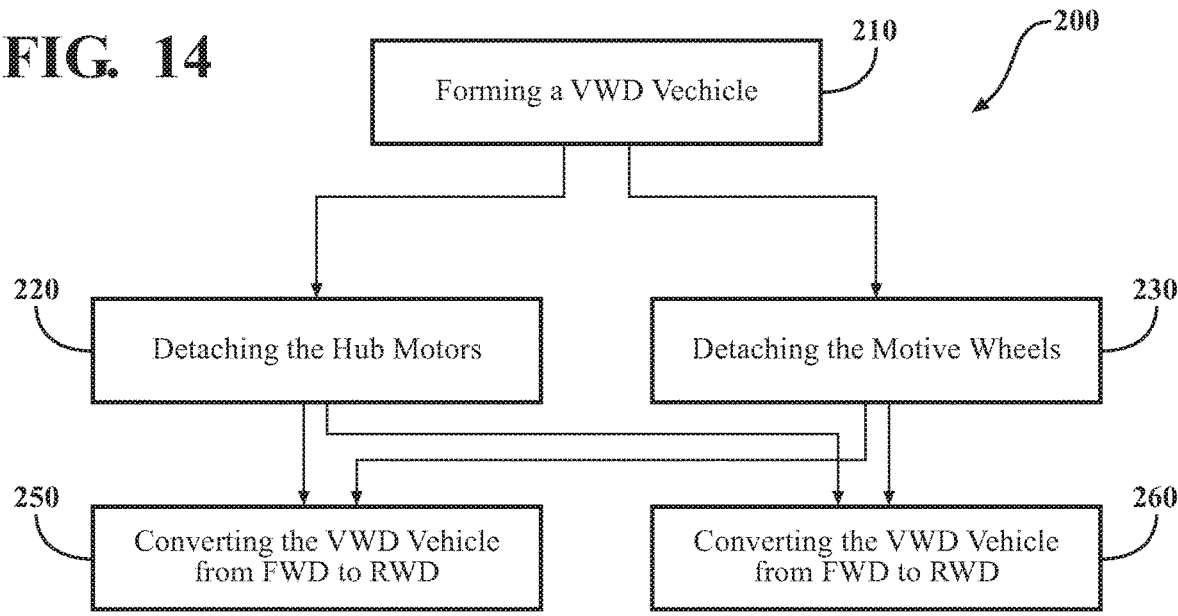
FIG. 14 is a flowchart of an embodiment of a method of using a VWD electric vehicle as described herein.

Referring to FIG. 14, in one embodiment, a method of using 200 a variable wheel drive electric vehicle is also disclosed. The method 200 comprises forming 210 a variable wheel drive electric vehicle 12 comprising: a vehicle chassis 8; a first axle 20 disposed on the vehicle chassis, comprising: a pair of opposed first axle ends 16, 18, the opposed first axle ends axially spaced apart along a first axle axis 26; a pair of first axle hubs 32 attached to the first axle ends; a pair of motive wheels 14 each comprising an first inner surface 36 and a first outer surface 38 and configured for radially extending rotatable disposition on the first axle hubs; and a pair of electric hub motors 48 each comprising a non-rotatable stator 96 that is non-rotatable and a rotor 46, the stators configured for selective attachment to and detachment from the first axle hubs 32, the rotors configured for selective attachment to and detachment from the motive wheels 14, the rotors configured for reversible motive rotation of the motive wheels by and about the stators; a second axle 20' longitudinally spaced from the first axle and disposed on the vehicle chassis, comprising: a pair of opposed second axle ends 16', 18', the opposed second axle ends axially spaced apart along a second axle axis 26'; a pair of second axle hubs 32' attached to the opposed second axle ends; a pair of non-motive wheels 14' each comprising a second inner surface 36' and a second outer surface 38' and configured for radially extending rotatable disposition on the second axle hubs; and a pair of hub motor blanks 48' each comprising a stator blank 96' and a rotor blank 46', the stator blanks configured for selective attachment to and detachment from the second axle hubs, the rotor blanks configured for selective attachment to and detachment from the non-motive wheels, the rotor blanks configured for reversible non-motive rotation of the non-motive wheels by and about the stator blanks. The method 200 also comprises detaching 220 the electric hub motors 48 from the first axle hubs 32 and the motive wheels 14 and detaching the hub motor blanks 48' from the second axle hubs 32' and the non-motive wheels 14', and attaching the electric hub motors to the second axle hubs 32' and the non-motive wheels 14' which thereby become the motive wheels 14, and attaching the hub motor blanks 48' to the first axle hub 32 and the motive wheels which thereby become the non-motive wheels 14', whereby the motive wheels 14 are moved from disposition along the first axle axis 26 to disposition along the second axle axis 26' and the non-motive wheels 14' are moved from disposition along the second axle axis 26' to disposition along the first axle axis 26. Or alternately, the method 200 also comprises detaching 230 the motive wheels 14 from the first axle hub 32 and the non-motive wheels 14' from the second axle hub 32' and attaching the motive wheels 14 to the second axle hub 32' and the non-motive wheels 14' to the first axle hub 32, whereby the motive wheels 14 are moved from disposition along the first axle axis 26 to disposition along the second axle axis 26' and the non-motive wheels 14' are moved from disposition along the second axle axis 26' to disposition along the first axle axis 26.

Figure 4:
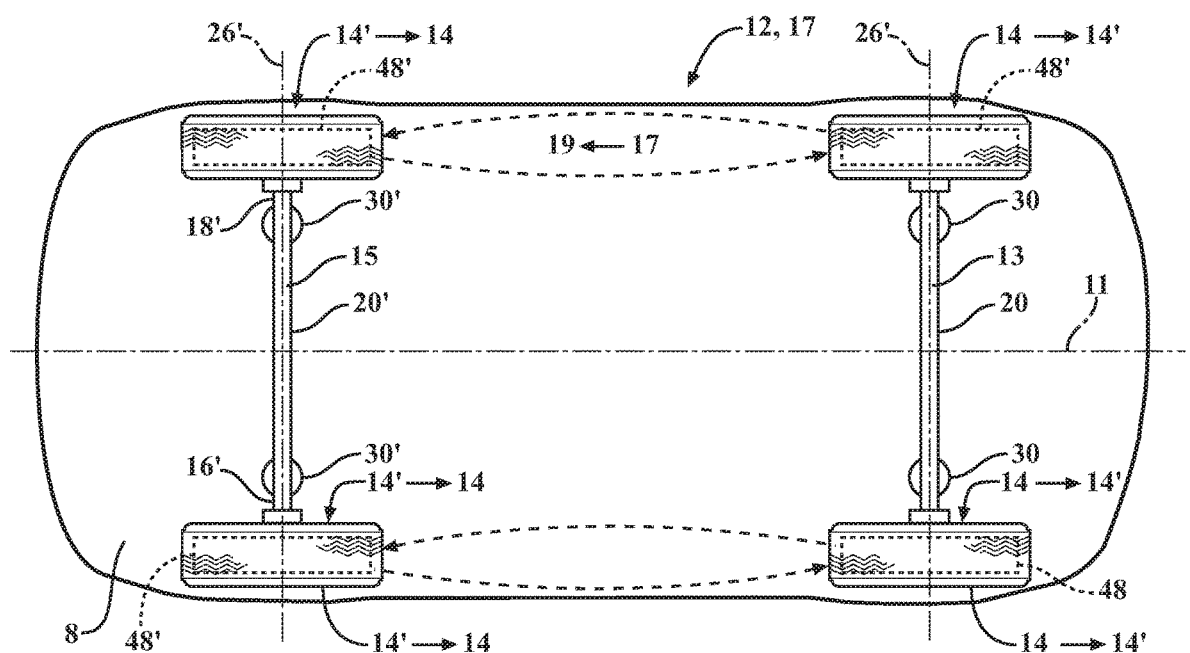
FIG. 4 is a schematic bottom view of an embodiment of a VWD electric vehicle configured for front-wheel drive (FWD) comprising a pair of motive wheels and selectively attachable and detachable electric hub motors that comprise a front axle and pair of non-motive wheels and selectively attachable and detachable hub motor blanks comprising a rear axle, as described herein, as well as a method of using the electric vehicle of FIG. 4 by moving the motive wheels from the front axle to the rear axle and the non-motive wheels from the rear axle to the front axle, or by moving the electric hub motors from the front axle to the rear axle and the hub motor blanks from the rear axle to the front axle, to convert the FWD vehicle to a rear-wheel drive (RWD) vehicle, as described herein.
Figure 5:
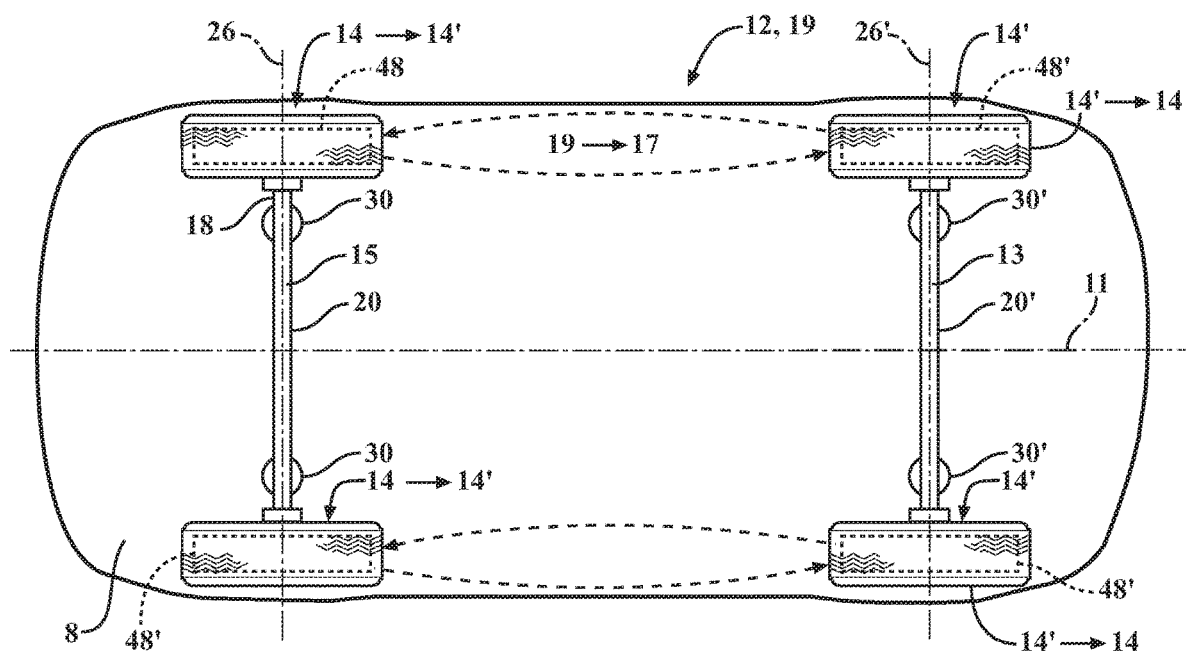
FIG. 5 is a schematic bottom view of an embodiment of a VWD electric vehicle configured for RWD comprising a pair of non-motive wheels and selectively attachable and detachable hub motor blanks that comprise a front axle and pair of motive wheels and selectively attachable and detachable electric hub motors comprising a rear axle, as described herein, as well as a method of using the electric vehicle of FIG. 5 by moving the non-motive wheels from the front axle to the rear axle and the motive wheels from the rear axle to the front axle, or by moving the hub motor blanks from the front axle to the rear axle and the electric hub motors from the rear axle to the front axle, to convert the RWD vehicle to an FWD vehicle, as described herein.
Figure 6:
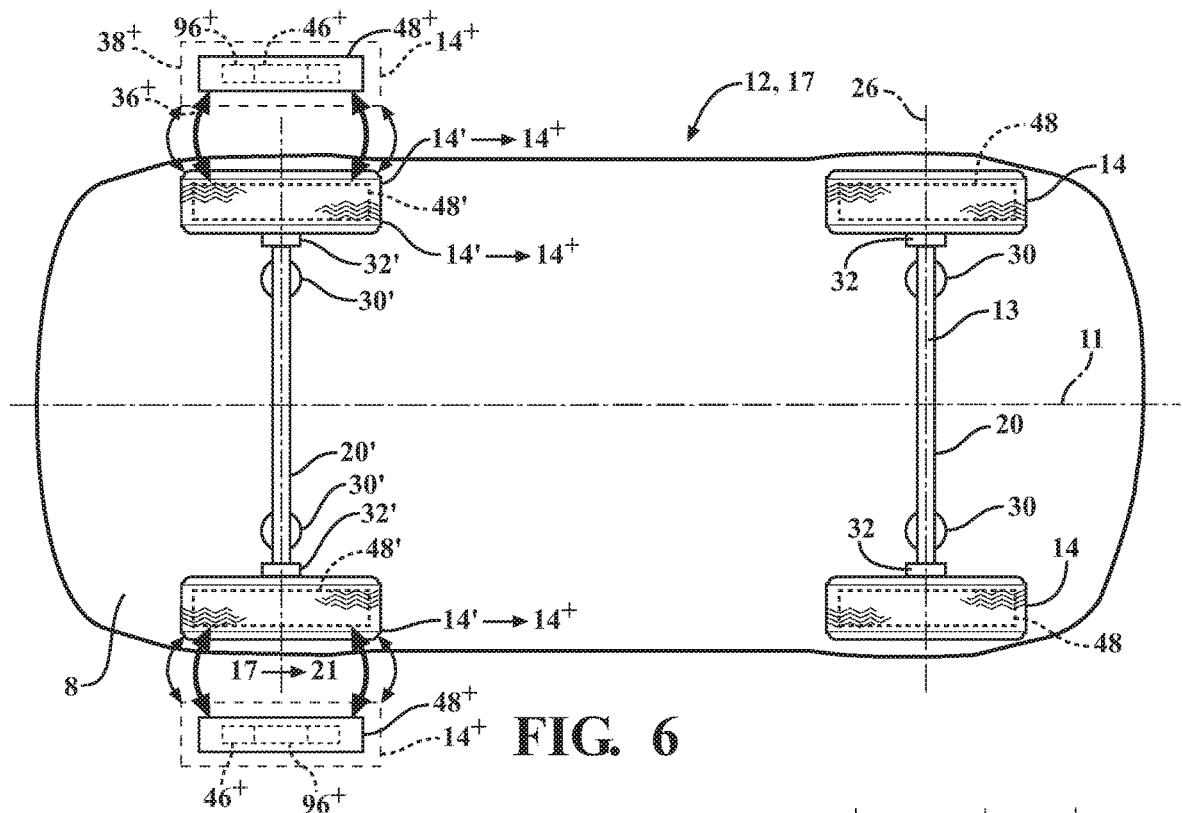
FIG. 6 is a schematic bottom view of an embodiment of an electric vehicle configured for all-wheel drive (AWD) or 4 wheel drive (4WD) comprising a pair of motive wheels and selectively attachable and detachable electric hub motors that comprise a front axle and pair of motive wheels and selectively attachable and detachable electric hub motors that comprise a rear axle, as described herein, as well as a method of using the electric vehicle of FIG. 4 by detaching the non-motive wheels and attaching additional motive wheels to the rear axle to convert the FWD vehicle to an AWD or 4WD vehicle, or by detaching the hub motor blanks and attaching additional electric hub motors to the non-motive wheels on the rear axle to convert the non-motive wheels to motive wheels, in order to convert the FWD vehicle to an AWD or 4WD vehicle, as described herein.
Figure 7:
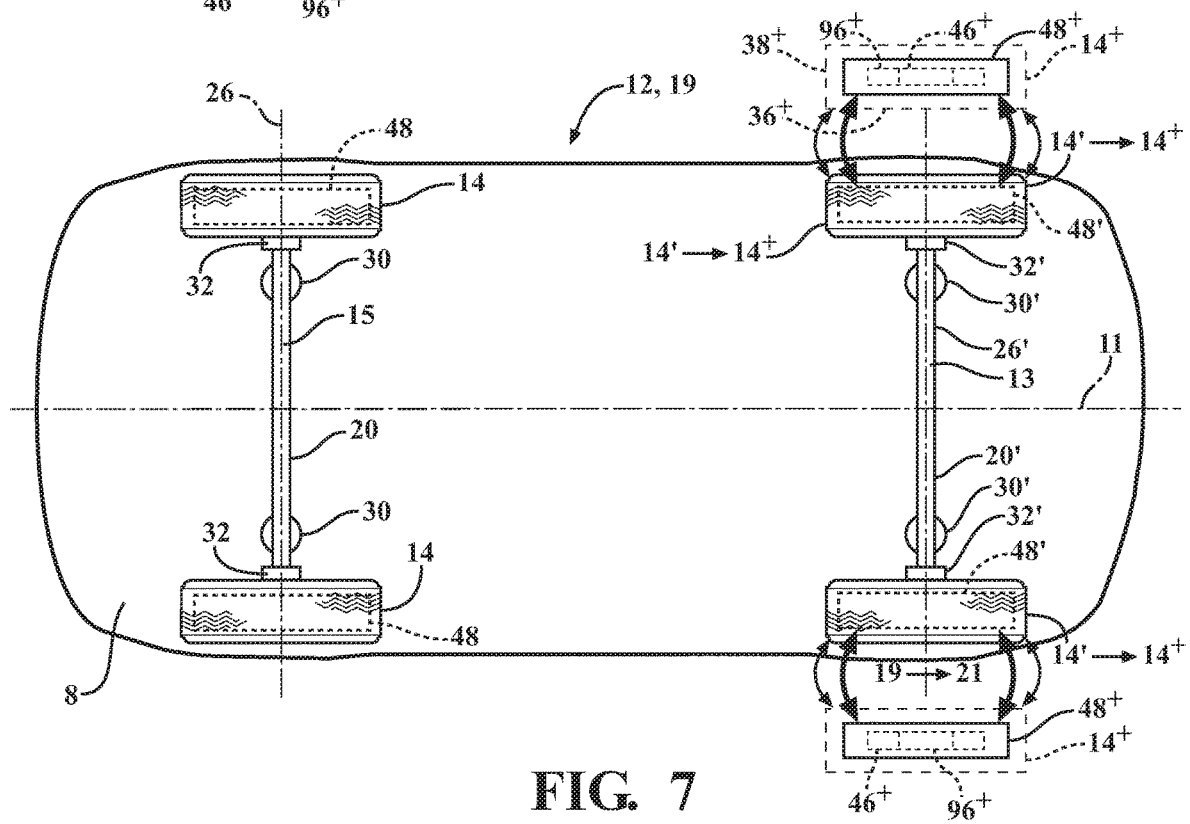
FIG. 7 is a schematic bottom view of an embodiment of an electric vehicle configured for all-wheel drive (AWD) or 4 wheel drive (4WD) comprising a pair of motive wheels and selectively attachable and detachable electric hub motors that comprise a front axle and pair of motive wheels and selectively attachable and detachable electric hub motors that comprise a rear axle, as described herein, as well as a method of using the electric vehicle of FIG. 5 by detaching the non-motive wheels and attaching additional motive wheels to the front axle to convert the RWD vehicle to an AWD or 4WD vehicle, or by detaching the hub motor blanks and attaching additional electric hub motors to the non-motive wheels on the front axle to convert the non-motive wheels to motive wheels, in order to convert the RWD vehicle to an AWD or 4WD vehicle, as described herein.

In one embodiment, the method of using 200 is used with a variable wheel drive electric vehicle 12 where the first axle 20, or first axle, comprises a front axle 13 and the second axle 20' comprises a rear axle 15 and the VWD electric vehicle 12 comprises an FWD vehicle 17, and the method of using comprises converting 250 the FWD vehicle 17 to an RWD vehicle 19 FIG. 4), or alternately where the first axle 20, or first axle, comprises a rear axle 15 and the second axle 20' comprises a front axle 13 and the VWD electric vehicle 12 comprises a RWD vehicle 19, and the method of using 200 comprises converting 260 the RWD vehicle 19 to an FWD vehicle 17.

Figure 15:
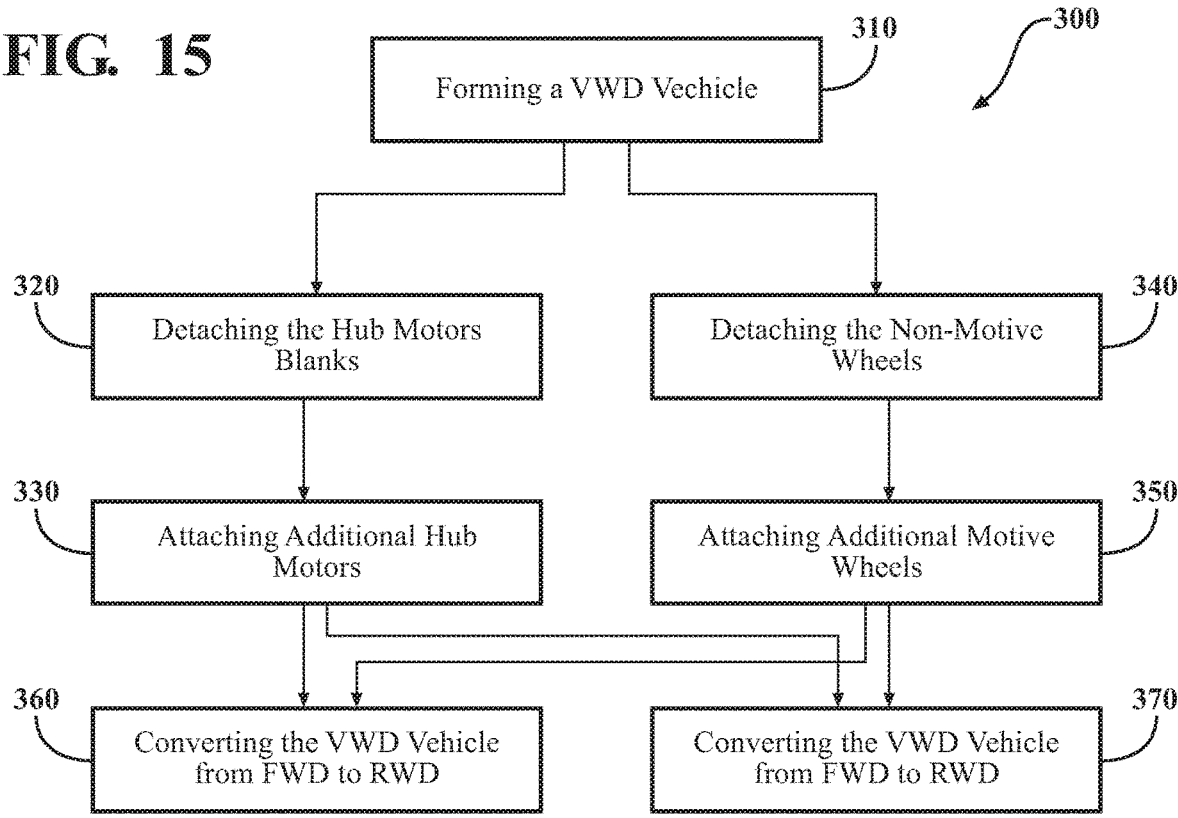
FIG. 15 is a flowchart of a second embodiment of a method of using a VWD electric vehicle as described herein.

Referring to FIG. 15, in another embodiment, a method of using 300 a variable wheel drive electric vehicle 12 is also disclosed. The method 300 comprises forming 310 a variable wheel drive electric vehicle 12 comprising: a vehicle chassis 8; a first axle 20 disposed on the vehicle chassis, comprising: a pair of opposed first axle ends 16, 18, the opposed first axle ends axially spaced apart along a first axle axis 26; a pair of first axle hubs 32 attached to the first axle ends; a pair of motive wheels 14 each comprising a first inner surface 36 and a first outer surface 38 and configured for radially extending rotatable disposition on the first axle hubs; and a pair of electric hub motors 48 each comprising a non-rotatable stator 96 and a rotor 46, the stators configured for selective attachment to and detachment from the first axle hubs 32, the rotors configured for selective attachment to and detachment from the motive wheels 14, the rotors configured for reversible motive rotation of the motive wheels by and about the stators; a second axle 20' longitudinally spaced from the first axle and disposed on the vehicle chassis, comprising: a pair of opposed second axle ends 16', 18', the opposed second axle ends axially spaced apart along a second axle axis 26'; a pair of second axle hubs 32' attached to the opposed second axle ends; a pair of non-motive wheels 14' each comprising an second inner surface 36' and a second outer surface 38' and configured for radially extending rotatable disposition on the second axle hubs; and a pair of hub motor blanks 48' each comprising a stator blank 96' and a rotor blank 46', the stator blanks configured for selective attachment to and detachment from the second axle hubs, the rotor blanks configured for selective attachment to and detachment from the non-motive wheels, the rotor blanks configured for reversible non-motive rotation of the non-motive wheels by and about the stator blanks. The method 300 also comprises detaching 320 the hub motor blanks 48' from the second axle hubs 32' and the non-motive wheels 14', and attaching 330 a pair of additional electric hub motors 48⁺, each additional hub motor comprising an additional non-rotatable stator 96⁺ and an additional rotor 46⁺, the additional stators configured for selective attachment to and detachment from the second axle hubs, the additional rotors configured for selective attachment to and detachment from the non-motive wheels by attaching the additional stators to the second axle hubs and attaching the additional rotors to the non-motive wheels which thereby become additional motive wheels configured for reversible motive rotation by and about the additional stators, wherein the variable wheel drive electric vehicle 12 comprises an AWD or 4WD vehicle 21. Or alternately, the method 300 also comprises detaching 340 the non-motive wheels 14' from the second axle hub 32', and attaching 350 a pair of additional motive wheels 14⁺ to the second axle hub 32', the additional electric hub motors each comprising an additional non-rotatable stator 96⁺ and an additional rotor 46⁺, the additional stators configured for selective attachment to and detachment from the second axle hubs, the additional rotors configured for selective attachment to and detachment from the additional motive wheels, the additional rotors configured for reversible motive rotation of the additional motive wheels by and about the additional stators, wherein the variable wheel drive electric vehicle 12 comprises an AWD or 4WD vehicle 21.

In one embodiment, the method of using 300 is used with a variable wheel drive electric vehicle 12 where the first axle 20, or first axle, comprises a front axle 13 and the second axle 20' comprises a rear axle 15 and the VWD electric vehicle comprises an FWD vehicle 17, and the method of using 300 further comprises converting 360 the FWD vehicle 17 to an AWD or 4WD vehicle 21, or wherein the first axle 20, or first axle, comprises a rear axle 15 and the second axle 20' comprises a front axle 13 and the VWD electric vehicle 12 comprises an RWD vehicle 19, and the method of using 300 comprises converting 370 the RWD vehicle 19 to an AWD or 4WD vehicle 21.

In one embodiment, the method of using 300 is used with a variable wheel drive electric vehicle 12 that further comprises a third axle 20" disposed on the vehicle chassis 8 comprising a pair of opposed third axle ends 16", 18"; the opposed third axle ends axially spaced apart along a third axle axis 26"; a pair of third axle hubs 32" attached to the third axle ends, wherein the third axle is disposed between the first axle 20, or first axle, and the second axle 20', or wherein the third axle is disposed outward of the first axle or the second axle. In this embodiment, the method of using 300 a variable wheel drive electric vehicle 12 further comprises: attaching 370 a pair of additional motive wheels 14⁺ configured for radially extending rotatable disposition on the third axle hubs 32", each comprising an additional inner surface 36⁺, an additional outer surface 38⁺ and an additional electric hub motor 48⁺, the additional hub motor comprising an additional non-rotatable stator 96⁺ and an additional rotor 46⁺, the additional stator configured for selective attachment to and detachment from the third axle hub, the additional rotor configured for selective attachment to and detachment from the additional motive wheel, the additional rotor configured for reversible motive rotation of the additional motive wheel by and about the additional stator.

The term "first" as used herein in conjunction with a various elements generally is in reference to elements and components of motive wheels 14 to distinguish them from elements and components of non-motive wheels 14', which have generally been designated with the term "second", and to also distinguish them from elements and components of additional motive wheels 14⁺, which have generally been designated with the terms "third" or "additional". In certain embodiments, elements of motive wheels 14, non-motive wheels 14', and additional motive wheels 14⁺ with the same names and references may be the same, or have the same size and shape, and are configured to be interchangeable, and in certain other embodiments, these elements may be different.

The terms "a" and "an" herein do not denote a limitation of quantity, but rather denote the presence of at least one of the referenced items. The modifier "about" used in connection with a quantity is inclusive of the stated value and has the meaning dictated by the context (e.g., includes the degree of error associated with measurement of the particular quantity). Furthermore, unless otherwise limited all ranges disclosed herein are inclusive and combinable (e.g., ranges of "up to about 25 weight percent (wt. %), more particularly about 5 wt. % to about 20 wt. % and even more particularly about 10 wt. % to about 15 wt. %" are inclusive of the endpoints and all intermediate values of the ranges, e.g., "about 5 wt. % to about 25 wt. %, about 5 wt. % to about 15 wt. %", etc.). The use of "about" in conjunction with a listing of items is applied to all of the listed items, and in conjunction with a range to both endpoints of the range. Finally, unless defined otherwise, technical and scientific terms used herein have the same meaning as is commonly understood by one of skill in the art to which this invention belongs. The suffix "(s)" as used herein is intended to include both the singular and the plural of the term that it modifies, thereby including one or more of that term (e.g., the metal(s) includes one or more metals). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments.

It is to be understood that the use of "comprising" in conjunction with the components or elements described herein specifically discloses and includes the embodiments that "consist essentially of" the named components (i.e., contain the named components and no other components that significantly adversely affect the basic and novel features disclosed), and embodiments that "consist of" the named components (i.e., contain only the named components).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:
1. A variable wheel drive electric vehicle, comprising:
 a vehicle chassis;
 a first axle disposed on the vehicle chassis, comprising:
  a pair of opposed first axle ends, the opposed first axle ends axially spaced apart along a first axle axis;
  a pair of first axle hubs attached to the first axle ends;
  a pair of motive wheels each comprising an inner surface and an outer surface and configured for radially extending rotatable disposition on the first axle hubs; and a pair of electric hub motors each comprising a stator and a rotor, the stators configured for selective attachment to and detachment from the first axle hubs, the rotors configured for selective attachment to and detachment from the motive wheels, the rotors configured for reversible motive rotation of the motive wheels by and about the stators;

a second axle longitudinally spaced from the first axle and disposed on the vehicle chassis, comprising:

a pair of opposed second axle ends, the opposed second axle ends axially spaced apart along a second axle axis;

a pair of second axle hubs attached to the opposed second axle ends;

a pair of non-motive wheels each comprising an inner surface and an outer surface and configured for radially extending rotatable disposition on the second axle hubs; and a pair of hub motor blanks each comprising a stator blank and a rotor blank, the stator blanks configured for selective attachment to and detachment from the second axle hubs, the rotor blanks configured for selective attachment to and detachment from the non-motive wheels, the rotor blanks configured for reversible non-motive rotation of the non-motive wheels by and about the stator blanks.

2. The variable wheel drive electric vehicle of claim 1, further comprising a pair of motor housings and a pair of motor blank housings configured to be disposed over and cover the electric hub motors and hub motor blanks, respectively.

3. The variable wheel drive electric vehicle of claim 2, wherein the electric hub motors and the hub motor blanks are configured for attachment to the first axle hub and the second axle hub, respectively, by a plurality of hub fasteners that extend through the motor housings and electric hub motors, and the blank housings and hub motor blanks, respectively.

4. The variable wheel drive electric vehicle of claim 1, wherein the first axle comprises a front axle and the second axle comprises a rear axle, and the variable wheel drive electric vehicle comprises a front-wheel drive vehicle.

5. The variable wheel drive electric vehicle of claim 4, wherein the electric hub motors are configured for detachment from the first axle hubs and motive wheels, the hub motor blanks are configured for detachment from the second axle hubs and non-motive wheels, the electric hub motors are configured for attachment to the second axle hubs and the non-motive wheels which thereby become motive wheels, and the hub motor blanks are configured for attachment to the first axle hubs and motive wheels which thereby become non-motive wheels, and wherein the variable wheel drive electric vehicle is converted from the front-wheel drive vehicle to a rear-wheel drive vehicle.

6. The variable wheel drive electric vehicle of claim 4, further comprising a pair of additional electric hub motors each comprising an additional stator and an additional rotor, the additional stators configured for selective attachment to and detachment from the second axle hubs, the additional rotors configured for selective attachment to and detachment from the non-motive wheels, and wherein upon detachment of the stator blanks and rotor blanks and attachment of the additional stators and the additional rotors, the non-motive wheels are converted to additional motive wheels, and the variable wheel drive electric vehicle is converted from the front-wheel drive vehicle to an all-wheel drive vehicle or a four wheel drive vehicle.

7. The variable wheel drive electric vehicle of claim 4, wherein the motive wheels are configured for detachment from the first axle hubs, the non-motive wheels are configured for detachment from the second axle hubs, the motive wheels are configured for attachment to the second axle hubs, and the non-motive wheels are configured for attachment to the first axle hubs, and wherein the variable wheel drive electric vehicle is configured to be converted from the front-wheel drive vehicle to a rear-wheel drive vehicle.

8. The variable wheel drive electric vehicle of claim 4, further comprising a pair of additional motive wheels each comprising an additional inner surface and an additional outer surface and configured for radially extending rotatable motive disposition on the second axle hubs, wherein upon detachment of the non-motive wheels from the second axle hubs and attachment of the additional motive wheels to the second axle hubs the variable wheel drive electric vehicle is converted from the front-wheel drive vehicle to an all-wheel drive vehicle or a four wheel drive vehicle.

9. The variable wheel drive electric vehicle of claim 1, wherein the first axle comprises a rear axle and the second axle comprises a front axle, and the variable wheel drive electric vehicle comprises a rear-wheel drive vehicle.

10. The variable wheel drive electric vehicle of claim 9, wherein the electric hub motors are configured for detachment from the first axle hubs and motive wheels, the hub motor blanks are configured for detachment from the second axle hubs and the non-motive wheels, the electric hub motors are configured for attachment to the second axle hubs and the non-motive wheels which thereby become motive wheels, and the hub motor blanks are configured for attachment to the first axle hubs and motive wheels which thereby become non-motive wheels, and wherein the variable wheel drive electric vehicle is converted from the rear-wheel drive vehicle to a front-wheel drive vehicle.

11. The variable wheel drive electric vehicle of claim 9, further comprising a pair of additional electric hub motors each comprising an additional stator and an additional rotor, the additional stators configured for selective attachment to and detachment from the second axle hubs, the additional rotors configured for selective attachment to and detachment from the non-motive wheels, and wherein upon attachment of the additional stators and the additional rotors, the non-motive wheels are converted to additional motive wheels, and the variable wheel drive electric vehicle is converted from the rear-wheel drive vehicle to an all-wheel drive vehicle or a four wheel drive vehicle.

12. The variable wheel drive electric vehicle of claim 9, wherein the motive wheels are configured for detachment from the first axle hubs, the non-motive wheels are configured for detachment from the second axle hubs, the motive wheels are configured for attachment to the second axle hubs, and the non-motive wheels are configured for attachment to the first axle hubs, and wherein the variable wheel drive electric vehicle is configured to be converted from the rear-wheel drive vehicle to a front-wheel drive vehicle.

13. The variable wheel drive electric vehicle of claim 9, further comprising a pair of additional motive wheels each comprising an additional inner surface and an additional outer surface and configured for radially extending rotatable motive disposition on the second axle hubs, wherein upon detachment of the non-motive wheels from the second axle hubs and attachment of the additional motive wheels to the second axle hubs the variable wheel drive electric vehicle is converted from the rear-wheel drive vehicle to an all-wheel drive vehicle or a four wheel drive vehicle.

14. The variable wheel drive electric vehicle of claim 11, further comprising:
a third axle disposed on the vehicle chassis, comprising:
a pair of opposed third axle ends, the opposed third axle ends axially spaced apart along a third axle axis; and
a pair of third axle hubs attached to the third axle ends, wherein the third axle is disposed between the first axle and the second axle, or wherein the third axle is disposed outward of the first axle or the second axle.

15. The variable wheel drive electric vehicle of claim 14, further comprising:
a pair of additional motive wheels each comprising an inner surface and an outer surface and configured for radially extending rotatable disposition on the third axle hubs; and
a pair of additional electric hub motors each comprising an additional stator and an additional rotor, the additional stators configured for selective attachment to and detachment from the third axle hubs, the additional rotors configured for selective attachment to and detachment from the additional motive wheels, the additional rotors configured for reversible motive rotation of the additional motive wheels by and about the additional stators.

16. A method of using a variable wheel drive electric vehicle, comprising:
forming a variable wheel drive electric vehicle comprising: a vehicle chassis; a first axle disposed on the vehicle chassis, comprising: a pair of opposed first axle ends, the opposed first axle ends axially spaced apart along a first axle axis; a pair of first axle hubs attached to the first axle ends; a pair of motive wheels each comprising an inner surface and an outer surface and configured for radially extending rotatable disposition on the first axle hubs; and a pair of electric hub motors each comprising a stator and a rotor, the stators configured for selective attachment to and detachment from the first axle hubs, the rotors configured for selective attachment to and detachment from the motive wheels, the rotors configured for reversible motive rotation of the motive wheels by and about the stators; a second axle longitudinally spaced from the first axle and disposed on the vehicle chassis, comprising: a pair of opposed second axle ends, the opposed second axle ends axially spaced apart along a second axle axis; a pair of second axle hubs attached to the opposed second axle ends; a pair of non-motive wheels each comprising an inner surface and an outer surface and configured for radially extending rotatable disposition on the second axle hubs; and a pair of hub motor blanks each comprising a stator blank and a rotor blank, the stator blanks configured for selective attachment to and detachment from the second axle hubs, the rotor blanks configured for selective attachment to and detachment from the non-motive wheels, the rotor blanks configured for reversible non-motive rotation of the non-motive wheels by and about the stator blanks; and
detaching the electric hub motors from the first axle hubs and the motive wheels and detaching the hub motor blanks from the second axle hubs and the non-motive wheels, and attaching the electric hub motors to the second axle hubs and the non-motive wheels which thereby become the motive wheels, and attaching the hub motor blanks to the first axle hub and the motive wheels which thereby become the non-motive wheels, whereby the motive wheels are moved from disposition along the first axle axis to disposition along the second axle axis and the non-motive wheels are moved from disposition along the second axle axis to disposition along the first axle axis; or
detaching the motive wheels from the first axle hub and the non-motive wheels from the second axle hub and attaching the motive wheels to the second axle hub and the non-motive wheels to the first axle hub, whereby the motive wheels are moved from disposition along the first axle axis to disposition along the second axle axis and the non-motive wheels are moved from disposition along the second axle axis to disposition along the first axle axis.

17. The method of using a variable wheel drive electric vehicle of claim 16, wherein the first axle comprises a front axle and the second axle comprises a rear axle and the variable wheel drive electric vehicle comprises a front-wheel drive vehicle, and the method of using comprises converting the front-wheel drive vehicle to a rear-wheel drive vehicle, or wherein the first axle comprises a rear axle and the second axle comprises a front axle and the variable wheel drive electric vehicle comprises a rear-wheel drive vehicle, and the method of using comprises converting the rear-wheel drive vehicle to a front-wheel drive vehicle.

18. A method of using a variable wheel drive electric vehicle, comprising:
forming a variable wheel drive electric vehicle comprising: a vehicle chassis; a first axle disposed on the vehicle chassis, comprising: a pair of opposed first axle ends, the opposed first axle ends axially spaced apart along a first axle axis; a pair of first axle hubs attached to the first axle ends; a pair of motive wheels each comprising an inner surface and an outer surface and configured for radially extending rotatable disposition on the first axle hubs; and a pair of electric hub motors each comprising a stator and a rotor, the stators configured for selective attachment to and detachment from the first axle hubs, the rotors configured for selective attachment to and detachment from the motive wheels, the rotors configured for reversible motive rotation of the motive wheels by and about the stators; a second axle longitudinally spaced from the first axle and disposed on the vehicle chassis, comprising: a pair of opposed second axle ends, the opposed second axle ends axially spaced apart along a second axle axis; a pair of second axle hubs attached to the opposed second axle ends; a pair of non-motive wheels each comprising an inner surface and an outer surface and configured for radially extending rotatable disposition on the second axle hubs; and a pair of hub motor blanks each comprising a stator blank and a rotor blank, the stator blanks configured for selective attachment to and detachment from the second axle hubs, the rotor blanks configured for selective attachment to and detachment from the non-motive wheels, the rotor blanks configured for reversible non-motive rotation of the motive wheels by and about the stator blanks; and
detaching the hub motor blanks from the second axle hubs and the non-motive wheels, and attaching a pair of additional electric hub motors, each additional hub motor comprising an additional stator and an additional rotor, the additional stators configured for selective attachment to and detachment from the second axle hubs, the additional rotors configured for selective attachment to and detachment from the non-motive wheels by attaching the additional stators to the second axle hubs and attaching the additional rotors to the non-motive wheels which thereby become additional motive wheels configured for reversible motive rotation by and about the additional stators, wherein the variable wheel drive electric vehicle comprises an all-wheel drive vehicle; or detaching the non-motive wheels from the second axle hub, and attaching a pair of additional motive wheels to the second axle hub, the additional electric hub motors each comprising an additional stator and an additional rotor, the additional stators configured for selective attachment to and detachment from the second axle hubs, the additional rotors configured for selective attachment to and detachment from the additional motive wheels, the additional rotors configured for reversible motive rotation of the additional motive wheels by and about the additional stators, wherein the variable wheel drive electric vehicle comprises an all-wheel drive vehicle.

19. The method of using a variable wheel drive electric vehicle of claim 18, wherein the first axle comprises a front axle and the second axle comprises a rear axle and the variable wheel drive electric vehicle comprises a front-wheel drive vehicle, and the method of using comprises converting the front-wheel drive vehicle to an all-wheel drive vehicle, or wherein the first axle comprises a rear axle and the second axle comprises a front axle and the variable wheel drive electric vehicle comprises a rear-wheel drive vehicle, and the method of using comprises converting the rear-wheel drive vehicle to an all-wheel drive vehicle.

20. The method of using a variable wheel drive electric vehicle of claim 18, wherein the variable wheel drive electric vehicle further comprises a third axle disposed on the vehicle chassis, comprising: a pair of opposed third axle ends, the opposed third axle ends axially spaced apart along a third axle axis; a pair of third axle hubs attached to the third axle ends, wherein the third axle is disposed between the first axle and the second axle, or wherein the third axle is disposed outward of the first axle or the second axle, and wherein the method of using a variable wheel drive electric vehicle further comprises:

attaching a pair of additional motive wheels configured for radially extending rotatable disposition on the third axle hubs, each comprising an inner surface, an outer surface and an additional electric hub motor, the additional hub motor comprising an additional stator and an additional rotor, the additional stator configured for selective attachment to and detachment from the third axle hub, the additional rotor configured for selective attachment to and detachment from the additional motive wheel, the additional rotor configured for reversible motive rotation of the additional motive wheel by and about the additional stator.

* * * * *